US011546014B2

(12) United States Patent
Yang et al.

(10) Patent No.: US 11,546,014 B2
(45) Date of Patent: Jan. 3, 2023

(54) ELECTRONIC DEVICE AND METHOD FOR SUPPORTING HETEROGENEOUS COMMUNICATION TECHNIQUES SHARING FREQUENCY BAND

(71) Applicant: Samsung Electronics Co., Ltd., Suwon-si (KR)

(72) Inventors: Yi Yang, Suwon-si (KR); Moonseok Kang, Suwon-si (KR); Hyunkee Min, Suwon-si (KR); Moongee Cho, Suwon-si (KR); Geonwoo Kim, Suwon-si (KR); Sukgi Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/197,393

(22) Filed: Mar. 10, 2021

(65) Prior Publication Data

US 2021/0344377 A1 Nov. 4, 2021

(30) Foreign Application Priority Data

Apr. 29, 2020 (KR) ........................ 10-2020-0052857

(51) Int. Cl.
*H04B 1/00* (2006.01)
*H04B 1/719* (2011.01)
(Continued)

(52) U.S. Cl.
CPC ............ *H04B 1/719* (2013.01); *H04W 16/14* (2013.01); *H04W 84/12* (2013.01); *H04B 2201/71638* (2013.01)

(58) Field of Classification Search
CPC ......... H04B 1/719; H04B 2201/71638; H04W 16/14; H04W 84/12
(Continued)

(56) References Cited

U.S. PATENT DOCUMENTS 8,345,704 B2  1/2013 Desai et al.
9,467,260 B2  10/2016 Bi et al.
(Continued)

OTHER PUBLICATIONS

International Search Report dated Jun. 16, 2021, issued in International Application No. PCT/KR2021/003005.
(Continued)

*Primary Examiner* — Zewdu A Kassa
(74) *Attorney, Agent, or Firm* — Jefferson IP Law, LLP

(57) ABSTRACT

An electronic device is provided. The electronic device includes an antenna to transmit or receive a signal of a specific frequency band, a wireless local area network (WLAN) communication module, and an ultra-wide band (UWB) communication module, wherein the UWB communication module may be configured to transmit a first signal notifying that the specific frequency band is to be used to the WLAN communication module, and use the specific frequency band, wherein the WLAN communication module may be configured to terminate, in case that the specific frequency band is being used, a use of the specific frequency band within a preset time in response to reception of the first signal, and transmit, when the use of the specific frequency band is terminated, a second signal indicating whether the specific frequency band is used by the WLAN communication module to the UWB communication module.

20 Claims, 13 Drawing Sheets

(51) Int. Cl.
*H04W 16/14* (2009.01)
*H04W 84/12* (2009.01)

(58) Field of Classification Search
USPC ............................... 375/130, 219, 295, 316
See application file for complete search history.

(56) References Cited

U.S. PATENT DOCUMENTS

| | | |
|---|---|---|
| 2008/0062919 A1 | 3/2008 | Chen et al. |
| 2010/0158174 A1 | 6/2010 | Haartsen |
| 2010/0226348 A1* | 9/2010 | Thoukydides .... H04W 72/1215 455/63.1 |
| 2014/0211720 A1 | 7/2014 | Thoukydides |
| 2020/0067645 A1 | 2/2020 | Zhang et al. |
| 2021/0250775 A1* | 8/2021 | Hardin ................ H04W 52/367 |

OTHER PUBLICATIONS

Matti Hämäläinen, Raffaello Tesi, Jari Iinatti, UWB CO-Existence with IEEE802.11 a and UMTS in Modified Saleh-Valenzuela Channel, 0-7803-8373-7/04 IEEE, 2004.

Nikhil Vijay Kajale, UWB and WLAN Coexistence: a Comparison of Interference Reduction Techniques, University of South Florida Scholar Commons, 2005.

* cited by examiner

ELECTRONIC DEVICE AND METHOD FOR SUPPORTING HETEROGENEOUS COMMUNICATION TECHNIQUES SHARING FREQUENCY BAND

CROSS-REFERENCE TO RELATED APPLICATION(S)

This application is based on and claims priority under 35 U.S.C. § 119(a) of a Korean patent application number 10-2020-0052857, filed on Apr. 29, 2020, in the Korean Intellectual Property Office, the disclosure of which is incorporated by reference herein in its entirety.

BACKGROUND

1. Field

The disclosure relates to an electronic device and a method thereof for supporting heterogeneous communication techniques sharing a frequency band.

2. Description of Related Art

Ultra-wide band (UWB) is a short-range wireless communication protocol that uses radio waves, like Bluetooth or wireless fidelity (Wi-Fi), and is a wireless technology that can accurately measure distances with an error range of centimeters (cm) using a large bandwidth of 500 megahertz (MHz) or more. Electronic devices using UWB technology can transmit and receive data at low power over a wide frequency band.

A wireless local area network (WLAN), also referred to as wireless LAN or Wi-Fi) may refer to establishing a network environment ranging from a hub to individual terminals by using radio frequencies or light instead of a wired cable in a limited indoor or outdoor space or building, such as an office, shopping mall, or home. WLAN technology does not require wiring, allows easy relocation of terminals, allows communication while on the move, and can help establish a network in a short time. In addition, WLAN technology enables transmission and reception of a large amount of data with a low transmission delay, so it is used for various services in different fields.

The above information is presented as background information only to assist with an understanding of the disclosure. No determination has been made, and no assertion is made, as to whether any of the above might be applicable as prior art with regard to the disclosure.

SUMMARY

Some channels used by ultra-wide band (UWB) technology and some of frequency bands used by wireless local area network (WLAN) technology may overlap or be close. When the channel used in the UWB technology and the frequency band used in the WLAN technology overlap or are close together, interference may occur between the UWB signal and the WLAN signal. For example, UWB technology whose signal strength is weak compared to a WLAN signal may fail to execute a service.

Aspects of the disclosure are to address at least the above-mentioned problems and/or disadvantages and to provide at least the advantages described below. Accordingly, an aspect of the disclosure is to provide an electronic device and a method thereof for supporting heterogeneous communication techniques sharing a frequency band.

Additional aspects will be set forth in part in the description which follows and, in part, will be apparent from the description, or may be learned by practice of the presented embodiments.

In accordance with an aspect of the disclosure, an electronic device is provided. The electronic device includes an antenna to transmit or receive a signal of a specific frequency band, a WLAN communication module, and a UWB communication module, wherein the UWB communication module may be configured to transmit a first signal notifying that the specific frequency band is to be used to the WLAN communication module, and use the specific frequency band, wherein the WLAN communication module may be configured to terminate, in case that the specific frequency band is being used, a use of the specific frequency band within a preset time in response to reception of the first signal, and transmit, when the use of the specific frequency band is terminated, a second signal indicating whether the specific frequency band is used by the WLAN communication module to the UWB communication module.

In accordance with another aspect of the disclosure, method for operating an electronic device is provided. The method includes transmitting, by a UWB communication module, a first signal notifying that a specific frequency band is to be used to a WLAN module, terminating, in case that the specific frequency band is being used by the WLAN communication module, by the WLAN communication module, a use of the specific frequency band within a preset time in response to reception of the first signal, transmitting, when the use of the specific frequency band is terminated, by the WLAN communication module, a second signal indicating whether the specific frequency band is being used by the WLAN communication module to the UWB communication module, and using, by the UWB communication module, the specific frequency band.

According to various embodiments of the disclosure, the electronic device can stably provide a UWB service and a WLAN service using a specific frequency band.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
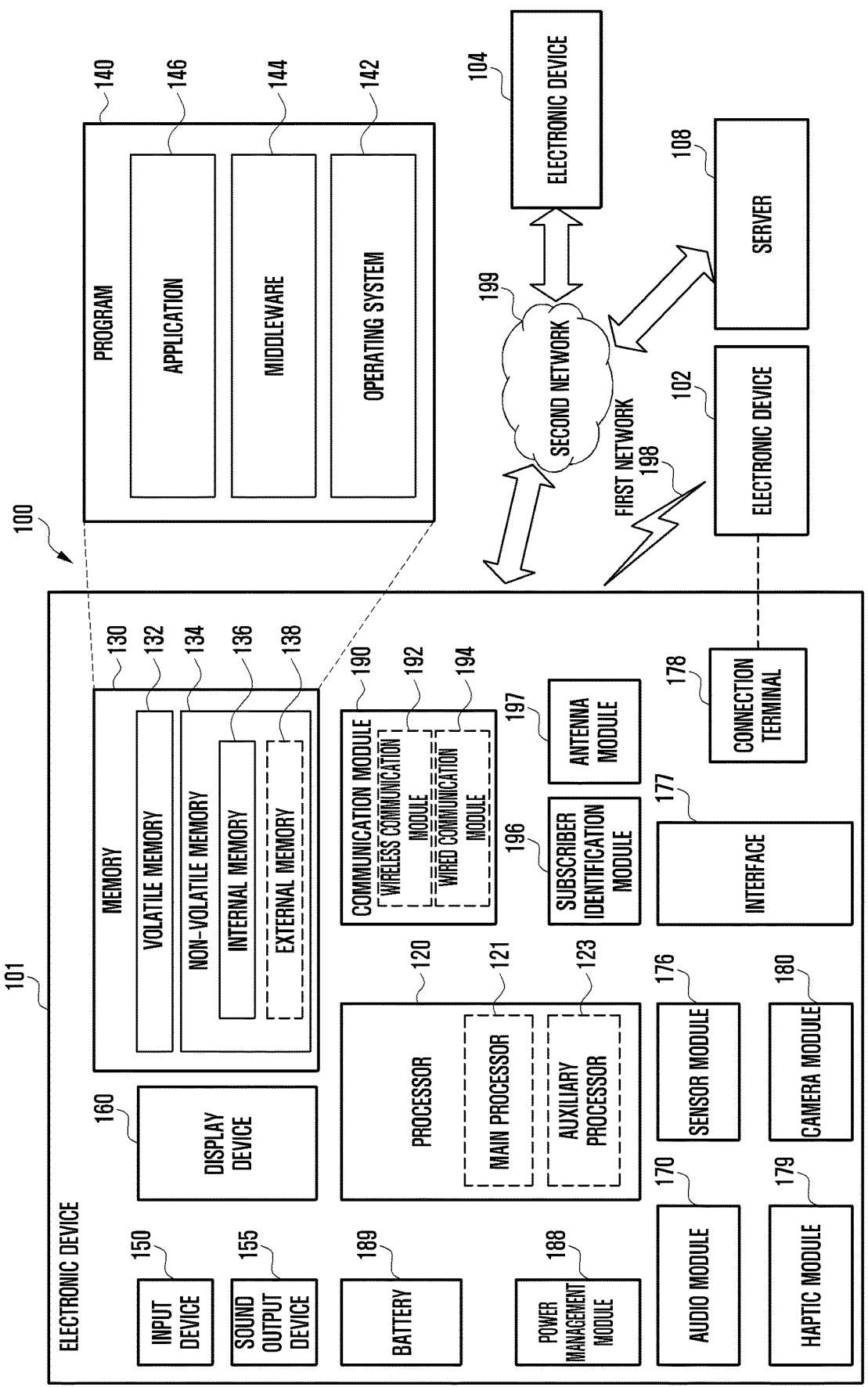
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2A:
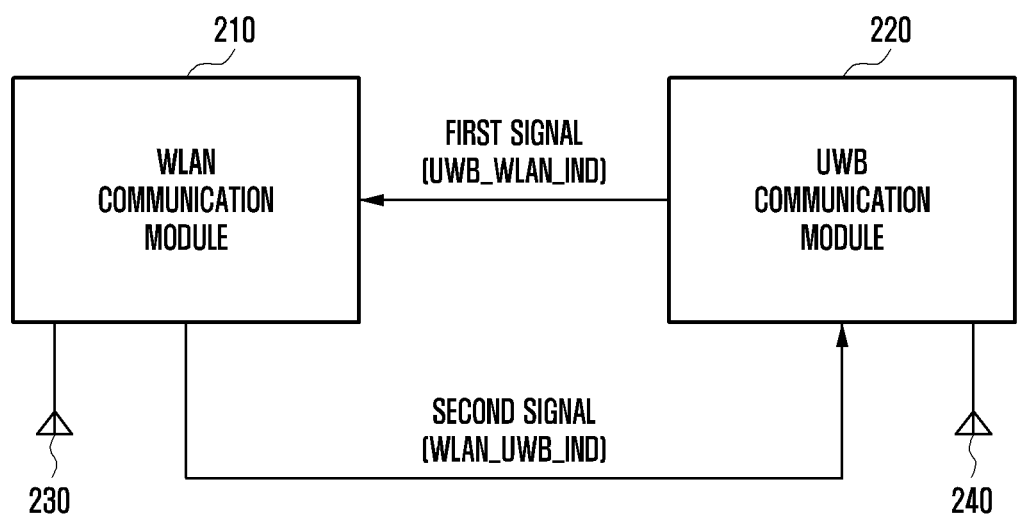
FIGS. 2A and 2B illustrates an internal structure of an electronic device according to various embodiments of the disclosure.
Figure 2B:
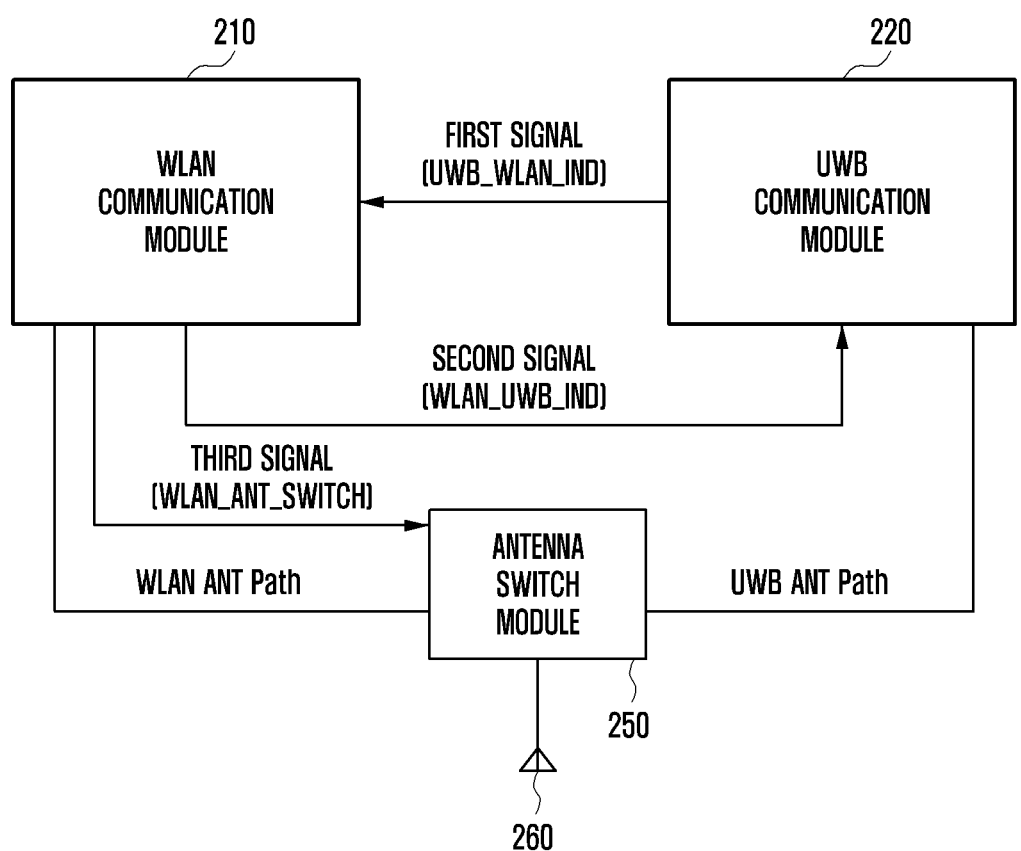

FIGS. 2A and 2B illustrates an internal structure of an electronic device according to various embodiments of the disclosure.

Referring to FIGS. 2A and 2B, the electronic device (e.g., electronic device 101 in FIG. 1) may include a wireless local area network (WLAN) communication module 210 (e.g., communication module 190 in FIG. 1), an ultra-wide band (UWB) communication module 220 (e.g., communication module 190 in FIG. 1), and antennas 230, 240 and 260 (e.g., antenna module 197 in FIG. 1).

In various embodiments of the disclosure, the WLAN communication module 210 may use a frequency band of 2.4 gigahertz (GHz), 5 GHz and/or 6 GHz, and the UWB communication module 220 may use a frequency band of 3.1 to 10.6 GHz. A specific frequency band (e.g., 6 GHz) may be used by the WLAN communication module 210 and the UWB communication module 220. To transmit or receive signals of a specific frequency band, the WLAN communication module 210 and the UWB communication module 220 may use, for example, different antennas 230 and 240 as shown in FIG. 2A, or may share, as another example, an antenna 260 as shown in FIG. 2B. When the WLAN communication module 210 and the UWB communication module 220 share the antenna 260, the electronic device 101 may further include an antenna switch module 250. In an embodiment of the disclosure, each of the antennas 230, 240 and/or 260 may include a plurality of antennas. In an embodiment of the disclosure, the WLAN communication module 210 may support multiple-input and multiple-output (MIMO) technology through the antennas 230 and/or 260.

In various embodiments of the disclosure, a specific frequency band (e.g., 6 GHz) may be a frequency band usable by both the WLAN communication module 210 and the UWB communication module 220. For example, the specific frequency band may be a frequency band in which interference may occur between the WLAN communication module 210 and the UWB communication module 220 among frequency bands available to both the WLAN communication module 210 and the UWB communication module 220. Interference between the WLAN communication module 210 and the UWB communication module 220 may vary in extent according to the degree of RF insulation of the printed circuit board (PCB) on which the WLAN communication module 210 and/or the UWB communication module 220 are placed, or the location where the WLAN communication module 210 and/or the UWB communication module 220 are mounted.

Referring to FIG. 2A, the WLAN communication module 210 may be connected to the first antenna 230, and the UWB communication module 220 may be connected to the second antenna 240. The first antenna 230 connected to the WLAN communication module 210 and/or the second antenna 240 connected to the UWB communication module 220 may transmit or receive a signal of a specific frequency band (e.g., 6 GHz).

In various embodiments of the disclosure, the WLAN communication module 210 is electrically or operatively connected to the first antenna 230 and may receive a signal from the outside (e.g., electronic device 102 in FIG. 1) and transmit a generated signal to the outside. The WLAN communication module 210 may be electrically or operatively connected to the UWB communication module 220. The WLAN communication module 210 may be electrically or operatively connected to the UWB communication module 220 and may transmit a second signal (e.g., WLAN_UWB_IND) to the UWB communication module 220. For example, the second signal may indicate whether the WLAN communication module 210 uses the specific frequency band (e.g., 6 GHz). In an embodiment of the disclosure, the WLAN communication module 210 may change the second signal (e.g., signal strength) to "high" to use the specific frequency band. The WLAN communication module 210 may change the strength (e.g., voltage level) of the second signal to "high" to use the specific frequency band, and maintain this strength until the use of the specific frequency band is ended. In an embodiment of the disclosure, when the use of the specific frequency band is ended, the WLAN communication module 210 may change the second signal to "low". The WLAN communication module 210 may change the strength (e.g., voltage level) of the second signal to "low" (e.g., ground) when the use of the specific frequency band is ended, and maintain this strength until the use of the specific frequency band is started. The WLAN communication module 210 may be electrically or operatively connected to the UWB communication module 220 and may receive a first signal (e.g., UWB_WLAN_IND) from the UWB communication module 220.

In various embodiments of the disclosure, when the WLAN communication module 210 executes a WLAN service by using a frequency band (e.g., 2.4 GHz, 5 GHz) other than the specific frequency band (e.g., 6 GHz), the second signal (e.g., signal strength) may be set to "low". The WLAN communication module 210 may change the second signal (e.g., signal strength) to "low" and maintain the second signal (e.g., signal strength).

In various embodiments of the disclosure, the UWB communication module 220 is electrically or operatively connected to the second antenna 240, and may receive a signal from the outside (e.g., electronic device 102 in FIG. 1) and transmit a generated signal to the outside. The UWB communication module 220 may be electrically or operatively connected to the WLAN communication module 210. The UWB communication module 220 may be electrically or operatively connected to the WLAN communication module 210 and may transmit a first signal (e.g., UWB_WLAN_IND) to the WLAN communication module 210. For example, the first signal may indicate whether the UWB communication module 220 uses a specific frequency band (e.g., 6 GHz). In an embodiment of the disclosure, the UWB communication module 220 may change the first signal (e.g., signal strength) to "high" to use the specific frequency band. The UWB communication module 220 may change the strength (e.g., voltage level) of the first signal to "high" to use the specific frequency band (e.g., 6 GHz), and maintain this strength until the use of the specific frequency band is ended. In an embodiment of the disclosure, when the use of the specific frequency band (e.g., 6 GHz) is ended, the UWB communication module 220 may change the first signal (e.g., signal strength) to "low". The UWB communication module 220 may change the strength (e.g., voltage level) of the first signal to "low" (e.g., ground) when the use of the specific frequency band is ended, and maintain this strength until the use of the specific frequency band is started again. The UWB communication module 220 may be electrically or operatively connected to the WLAN communication module 210 and may receive a second signal (e.g., WLAN_UWB_IND) from the UWB communication module 220.

In various embodiments of the disclosure, when the UWB communication module 220 executes a UWB service by using a frequency band other than the specific frequency band (e.g., 6 GHz), the first signal (e.g., signal strength) may be "low". When the UWB communication module 220 executes a UWB service by using a frequency band other than the specific frequency band (e.g., 6 GHz), the first signal (e.g., signal strength) may remain "low".

In various embodiments of the disclosure, the first signal and the second signal may be a general-purpose input/output (GPIO) signal, and may be generated through the interrupt mechanism when the state (e.g., value of the signal) changes (e.g., "high"→"low", or "low"→"high").

Referring to FIG. 2B, the WLAN communication module 210 and the UWB communication module 220 may be connected to the antenna 260 through the antenna switch module 250. The WLAN communication module 210 and the UWB communication module 220 may share the antenna 260 to transmit or receive signals of the same frequency band.

In various embodiments of the disclosure, the WLAN communication module 210 may be connected to the antenna 260 through the antenna switch module 250, and may receive a signal from the outside (e.g., electronic device 102 in FIG. 1) and transmit a generated signal to the outside. The antenna 260 connected to the WLAN communication module 210 and the antenna switch module 250 may be including a plurality of antennas. The WLAN communication module 210 may be electrically or operatively connected to the UWB communication module 220. The WLAN communication module 210 may be electrically or operatively connected to the UWB communication module 220 and may transmit a second signal (e.g., WLAN_UWB_IND) to the UWB communication module 220. For example, the second signal may indicate whether the WLAN communication module 210 uses a specific frequency band (e.g., 6 GHz). In an embodiment of the disclosure, the WLAN communication module 210 may change the second signal (e.g., signal strength) to "high" to use the specific frequency band. In an embodiment of the disclosure, when the use of the specific frequency band is ended, the WLAN communication module 210 may change the second signal (e.g., signal strength) to "low". The WLAN communication module 210 may change the second signal (e.g., signal strength) to "high" to use the specific frequency band, and may change the second signal (e.g., signal strength) to "low" when the use of the specific frequency band is ended. The WLAN communication module 210 may be electrically or operatively connected to the UWB communication module 220 and may receive a first signal (e.g., UWB_WLAN_IND) from the UWB communication module 220.

In various embodiments of the disclosure, when the WLAN communication module 210 executes a WLAN service by using a frequency band other than the specific frequency band (e.g., 6 GHz), the second signal (e.g., signal strength) may be "low".

In various embodiments of the disclosure, the WLAN communication module 210 may control the antenna switch module 250 as a host in relation to the UWB communication module 220. For example, the host may control the antenna switch module 250 to selectively change the antenna path (e.g., WLAN ANT Path or UWB ANT Path).

In various embodiments of the disclosure, the WLAN communication module 210 may be electrically or operatively connected to the antenna switch module 250 and may control the antenna switch module 250. The WLAN communication module 210 may be electrically or operatively connected to the antenna switch module 250 and may transmit a third signal (e.g., WLAN_ANT_SWITCH) to the antenna switch module 250. For example, the third signal may be a signal for controlling the antenna switch module 250. For example, the WLAN communication module 210 may change the third signal (e.g., signal strength) to "high" to allow the UWB communication module 220 to use the antenna 260. In other cases, the WLAN communication module 210 may change the third signal (e.g., signal strength) to "low" so that the antenna 260 may be used by the WLAN communication module 210.

In various embodiments of the disclosure, the third signal may be determined based on the first signal and the second signal. For example, when the UWB communication module 220 changes the first signal (e.g., signal strength) to "high" to use a specific frequency band (e.g., 6 GHz) and the WLAN communication module 210 ends the use of the specific frequency band and changes the second signal (e.g., signal strength) to "low", the third signal (e.g., signal strength) may be changed to "high".

In various embodiments of the disclosure, the UWB communication module 220 may be electrically or operatively connected to the antenna 260 through the antenna switch module 250, and may receive a signal from the outside (e.g., electronic device 102 in FIG. 1) and transmit a generated signal to the outside. The UWB communication module 220 may be electrically or operatively connected to the WLAN communication module 210. The UWB communication module 220 may be electrically or operatively connected to the WLAN communication module 210 and may transmit a first signal (e.g., UWB_WLAN_IND) to the WLAN communication module 210. For example, the first signal may indicate whether the UWB communication module 220 uses a specific frequency band (e.g., 6 GHz). In an embodiment of the disclosure, the UWB communication module 220 may change the first signal (e.g., signal strength) to "high" to use the specific frequency band. In an embodiment of the disclosure, when the use of the specific frequency band is ended, the UWB communication module 220 may change the second signal (e.g., signal strength) to "low". The UWB communication module 220 may be electrically or operatively connected to the WLAN communication module 210 and may receive a second signal (e.g., WLAN_UWB_IND) from the WLAN communication module 210.

In various embodiments of the disclosure, when the UWB communication module 220 executes a UWB service by using a frequency band other than the specific frequency band, the first signal (e.g., signal strength) may be "low".

In various embodiments of the disclosure, the first to third signals may be a general-purpose input/output (GPIO) signal, and may be generated through the interrupt mechanism when the state (e.g., signal strength) thereof changes (e.g., "high"→"low", or "low"→"high").

In an embodiment of the disclosure, although not shown, when the WLAN communication module 210 and the UWB communication module 220 share the antenna 260, the UWB communication module 220 may operate as a host for the antenna switch module 250. For example, the UWB communication module 220 may selectively change the antenna path (e.g., WLAN ANT Path or UWB ANT Path) by transmitting a fourth signal (not shown) to control the antenna switch module 250. The UWB communication module 220 may determine the fourth signal based on the first signal and the second signal.

Figure 3:
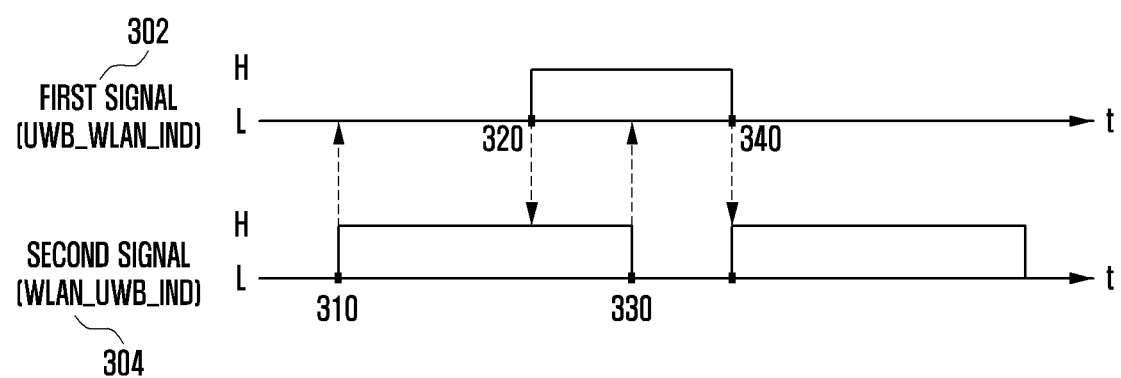
FIG. 3 illustrates signals transmitted and received between a wireless local area network (WLAN) communication module and an ultra-wide band (UWB) communication module according to an embodiment of the disclosure.

FIG. 3 illustrates signals transmitted and received between a WLAN communication module and a UWB communication module according to an embodiment of the disclosure.

Referring to FIG. 3, the first signal (e.g., UWB_WLAN_IND) may be a signal transmitted by the UWB communication module (e.g., UWB communication module 220 in FIGS. 2A and 2B) to the WLAN communication module (e.g., WLAN communication module 210 in FIGS. 2A and 2B). The first signal may be a signal for notifying the WLAN communication module 210 of whether the UWB communication module 220 uses a specific frequency band. For example, before using the specific frequency band, the UWB communication module 220 may change the first signal (e.g., signal strength) to "high" and transmit it to the WLAN communication module 210. As another example, when the use of the specific frequency band is ended, the UWB communication module 220 may change the first signal (e.g., signal strength) to "low" and transmit it to the WLAN communication module 210. In various embodiments of the disclosure, the first signal (e.g., signal strength) indicating whether a specific frequency band is used may be changed in reverse. For example, the UWB communication module 220 may change the first signal (e.g., signal strength) to "low" before using the specific frequency band, and may change the first signal (e.g., signal strength) to "high" and transmit it to the WLAN communication module 210 when the use of the specific frequency band is ended.

In various embodiments of the disclosure, when the UWB communication module 220 executes a UWB service by using a frequency band other than the specific frequency band, the first signal (e.g., signal strength) may be "low".

In various embodiments of the disclosure, the second signal (e.g., WLAN_UWB_IND) may be a signal transmitted by the WLAN communication module 210 to the UWB communication module 220. For example, the second signal may be a signal for notifying the UWB communication module 220 of whether the WLAN communication module 210 uses a specific frequency band. In an embodiment of the disclosure, before using the specific frequency band, the WLAN communication module 210 may change the second signal (e.g., signal strength) to "high" and transmit it to the UWB communication module 220. In an embodiment of the disclosure, when the use of the specific frequency band is ended, the WLAN communication module 210 may change the second signal (e.g., signal strength) to "low" and transmit it to the UWB communication module 220. In various embodiments of the disclosure, the second signal (e.g., signal strength) indicating whether a specific frequency band is used may be changed in reverse. For example, the WLAN communication module 210 may change the second signal (e.g., signal strength) to "low" before using the specific frequency band, and may change the second signal (e.g., signal strength) to "high" and transmit it to the UWB communication module 220 when the use of the specific frequency band is ended.

In various embodiments of the disclosure, when the WLAN communication module 210 executes a WLAN service by using a frequency band other than the specific frequency band, the second signal (e.g., signal strength) may be "low".

In various embodiments of the disclosure, when the UWB communication module 220 executes a UWB service by using a frequency band other than the specific frequency band, the first signal (e.g., signal strength) may be "low".

Referring to FIG. 3, the WLAN communication module 210 may transmit or receive data to or from the outside (e.g., electronic device 102 in FIG. 1) by using a specific frequency band at time 310. The WLAN communication module 210 may change the second signal 304 (e.g., WLAN_UWB_IND) (e.g., signal strength) to "high" and transmit it to the UWB communication module 220 at time 310. Time 310 may be a time point when the WLAN communication module 210 intends to use a signal of the specific frequency band. If the second signal 304 (e.g., signal strength) is "high", the UWB communication module 220 may be aware that the WLAN communication module 210 is using the specific frequency band (e.g., 6 GHz).

In various embodiments of the disclosure, when the second signal 304 (e.g., signal strength) is changed to "high", an interrupt may occur. In an embodiment of the disclosure, an interrupt may occur at a rising edge of the second signal 304 (e.g., signal strength).

In various embodiments of the disclosure, the UWB communication module 220 may provide a UWB service by using the specific frequency band (e.g., 6 GHz). To use the specific frequency band regardless of the state or strength (e.g., "high" or "low") of the second signal 304, the UWB communication module 220 may change the first signal 302 (e.g., UWB_WLAN_IND) (e.g., signal strength) to "high"

and transmit it to the WLAN communication module 210 at time 320. For example, the UWB communication module 220 may change the first signal 302 (e.g., signal strength) to "high" at time 320, which is a preset time (e.g., 30 ms) before using the specific frequency band. The UWB communication module 220 may transition to a sleep state until the second signal 304 (e.g., signal strength) is changed to "low". For example, the sleep state may be a deep power down state, which is the lowest power state.

In various embodiments of the disclosure, when the first signal 302 (e.g., signal strength) is changed to "high", an interrupt may occur. In an embodiment of the disclosure, an interrupt may occur at a rising edge of the first signal 302 (e.g., signal strength).

In various embodiments of the disclosure, the UWB service may have a higher priority in using the specific frequency band than the WLAN service. In an embodiment of the disclosure, a certain service among WLAN services may have a higher priority than UWB services. For example, a video phone or Internet phone service that is sensitive to transmission delay among the WLAN services may have a higher priority than the UWB services.

In various embodiments of the disclosure, WLAN services may have a higher priority in using the specific frequency band than UWB services, and a designated service among the UWB services may have a higher priority than the WLAN services.

In various embodiments of the disclosure, when the first signal 302 (e.g., signal strength) is changed to "high", the WLAN communication module 210 may end the use of the specific frequency band within a preset time. For example, when the first signal 302 (e.g., signal strength) is found to be changed to "high" by determining the corresponding interrupt, the WLAN communication module 210 may end the use of the specific frequency band within a preset time (e.g., time when the UWB communication module 220 transitions to the sleep state). After ending the use of the specific frequency band, the WLAN communication module 210 may notify the UWB communication module 220 that the specific frequency band is not used through the second signal 304. At time 330 where the use of the specific frequency band is ended, the WLAN communication module 210 may change the second signal 304 (e.g., signal strength) to "low" and transmit it to the UWB communication module 220.

In various embodiments of the disclosure, when the second signal 304 (e.g., signal strength) is changed to "low", an interrupt may occur. In an embodiment of the disclosure, an interrupt may occur at a falling edge of the second signal 304 (e.g., signal strength).

In various embodiments of the disclosure, when the second signal 304 (e.g., signal strength) is changed to "low", the UWB communication module 220 may execute a UWB service by using the specific frequency band. When the second signal 304 (e.g., signal strength) is found to be changed to "low" by determining the corresponding interrupt, the UWB communication module 220 may execute a UWB service by using the specific frequency band. At time 340 where the UWB service using the specific frequency band is ended, the UWB communication module 220 may change the first signal 302 (e.g., signal strength) to "low" and transmit it to the WLAN communication module 210.

In various embodiments of the disclosure, when the first signal 302 (e.g., signal strength) is changed to "low", an interrupt may occur. In an embodiment of the disclosure, an interrupt may occur at a falling edge of the first signal 302 (e.g., signal strength).

In various embodiments of the disclosure, when the first signal 302 (e.g., signal strength) is changed to "low", the WLAN communication module 210 may execute a WLAN service again by using the specific frequency band. When the first signal 302 (e.g., signal strength) is found to be changed to "low" by determining the corresponding interrupt, the WLAN communication module 210 may execute a WLAN service again by using the specific frequency band.

In various embodiments of the disclosure, an interrupt may occur when the state or strength of the first signal 302 and/or the second signal 304 is changed (e.g., "high"→"low", or "low"→"high"), and the WLAN communication module 210 and/or the UWB communication module 220 may determine the state or strength of the first signal 302 and/or the second signal 304 when an interrupt occurs.

Figure 4:
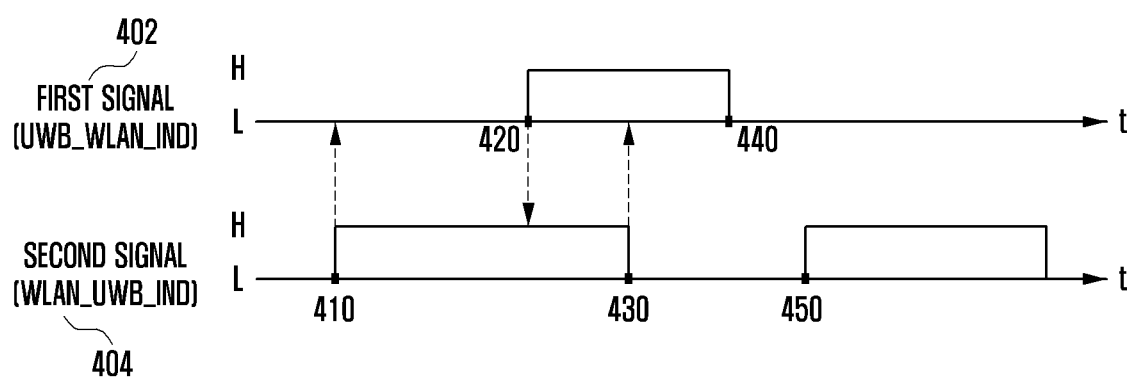
FIG. 4 illustrates signals transmitted and received between a WLAN communication module and a UWB communication module according to an embodiment of the disclosure.

FIG. 4 illustrates signals transmitted and received between a WLAN communication module and a UWB communication module according to an embodiment of the disclosure.

Referring to FIG. 4, the WLAN communication module 210 may transmit or receive data to or from the outside (e.g., electronic device 102 in FIG. 1) by using a specific frequency band at time 410. The WLAN communication module 210 may change the second signal 404 (e.g., WLAN_UWB_IND) (e.g., signal strength) to "high" and transmit it to the UWB communication module 220 at time 410. Time 410 may be a time point at which the WLAN communication module 210 intends to use a signal of the specific frequency band. When the second signal 404 (e.g., signal strength) is changed to "high", the UWB communication module 220 may be aware that the WLAN communication module 210 is using the specific frequency band (e.g., 6 GHz).

In various embodiments of the disclosure, when the second signal 404 (e.g., signal strength) is changed to "high", an interrupt may occur. In an embodiment of the disclosure, an interrupt may occur at a rising edge of the second signal 404 (e.g., signal strength).

In various embodiments of the disclosure, the UWB communication module 220 may have to provide a UWB service by using the specific frequency band (e.g., 6 GHz). To use the specific frequency band regardless of the state or strength (e.g., "high" or "low") of the second signal 404, at time 420, the UWB communication module 220 may change the first signal 402 (e.g., UWB_WLAN_IND) (e.g., signal strength) to "high" and transmit it to the WLAN communication module 210. For example, the UWB communication module 220 may change the first signal 402 (e.g., signal strength) to "high" at time 420, which is a preset time (e.g., 30 ms) before using the specific frequency band. The UWB communication module 220 may transition to a sleep state until the second signal 402 (e.g., signal strength) is changed to "low". For example, the sleep state may be a deep power down state with the lowest power. The sleep state may be a state in which some functions are disabled. The sleep state may be a state in which only minimum functionality is activated. Or, the sleep state may be a state in which the UWB communication module 220 is temporarily deactivated.

In various embodiments of the disclosure, when the first signal 402 (e.g., signal strength) is changed to "high", an interrupt may occur. In an embodiment of the disclosure, an interrupt may occur at a rising edge of the first signal 402 (e.g., signal strength).

In various embodiments of the disclosure, the UWB service may have a higher priority in using the specific frequency band than the WLAN service. In an embodiment of the disclosure, a certain service among WLAN services may have a higher priority than UWB services. For example, a video phone or Internet phone service that is sensitive to transmission delay among the WLAN services may have a higher priority than the UWB services.

In various embodiments of the disclosure, WLAN services may have a higher priority in using the specific frequency band than UWB services, and a designated service among the UWB services may have a higher priority than the WLAN services.

In various embodiments of the disclosure, when the first signal 402 (e.g., signal strength) is changed to "high", the WLAN communication module 210 may end the use of the specific frequency band within a preset time. For example, when the first signal 402 (e.g., signal strength) is found to be changed to "high" by determining the corresponding interrupt, the WLAN communication module 210 may end the use of the specific frequency band within a preset time (e.g., time when the UWB communication module 220 transitions to the sleep state). After ending the use of the specific frequency band, the WLAN communication module 210 may notify the UWB communication module 220 that the specific frequency band is not used through the second signal 404. When the use of the specific frequency band is ended, at time 430, the WLAN communication module 210 may change the second signal 404 (e.g., signal strength) to "low".

In various embodiments of the disclosure, when the second signal 404 (e.g., signal strength) is changed to "low", an interrupt may occur. In an embodiment of the disclosure, an interrupt may occur at a falling edge of the second signal 404 (e.g., signal strength).

In various embodiments of the disclosure, the WLAN communication module 210 may disable an interrupt from occurring according to a change of the first signal 402 (e.g., signal strength).

In various embodiments of the disclosure, when the second signal 404 (e.g., signal strength) is changed to "low", the UWB communication module 220 may execute a UWB service by using the specific frequency band. When the second signal 404 (e.g., signal strength) is found to be changed to "low" by determining the corresponding interrupt, the UWB communication module 220 may execute a UWB service by using the specific frequency band. When the UWB service using the specific frequency band is ended, at time 440, the UWB communication module 220 may change the first signal 402 (e.g., signal strength) to "low".

In various embodiments of the disclosure, even if the first signal 402 (e.g., signal strength) is changed to "low", an interrupt may not occur at time 440. In various embodiments of the disclosure, when the WLAN communication module 210 disables an interrupt from occurring at time 430, an interrupt may not occur.

In various embodiments of the disclosure, the WLAN communication module 210 determines the first signal 402 and, if the first signal 402 (e.g., signal strength) is "low", may execute a WLAN service again by using the specific frequency band.

In various embodiments of the disclosure, an interrupt may occur when the state or strength of the first signal 402 and/or the second signal 404 is changed (e.g., "high"→"low", or "low"→"high"), and the WLAN communication module 210 and/or the UWB communication module 220 may determine the state or strength of the first signal 402 and/or the second signal 404 when an interrupt occurs.

In various embodiments of the disclosure, even if the state or strength of the first signal 402 and/or the second signal 404 is changed, an interrupt may not occur. As an interrupt may not occur, the WLAN communication module 210 and/or the UWB communication module 220 may determine the state or strength of the first signal 402 and/or the second signal 404 if necessary and perform the subsequent operation. For example, before using the specific frequency band, the WLAN communication module 210 may determine the first signal 402 to determine whether the UWB communication module 220 is using the specific frequency band. Moreover, the UWB communication module 220 may change the second signal 404 to "high" at time 450 before using the specific frequency band.

A description will be given of various embodiments in which the WLAN communication module and the UWB communication module execute services by using a specific frequency band in a wake-up state or a sleep state referring to FIGS. 5 to 10.

According to various embodiments of the disclosure, in the following description, the operation of the WLAN communication module 210 and/or the UWB communication module 220 to transmit a first signal and/or a second signal may include the operation of the WLAN communication module 210 and/or the UWB communication module 220 to set the strength of the first signal and/or the second signal to "high" or "low". Additionally, the operation of the WLAN communication module 210 and/or the UWB communication module 220 to receive a first signal and/or a second signal may include the operation of the WLAN communication module 210 and/or the UWB communication module 220 to determine the strength of the first signal and/or the second signal. In various embodiments of the disclosure, the operation of the WLAN communication module 210 and/or the UWB communication module 220 to receive a first signal and/or a second signal may include an operation of receiving an interrupt generated according to a change in strength of the first signal and/or the second signal.

Figure 5:
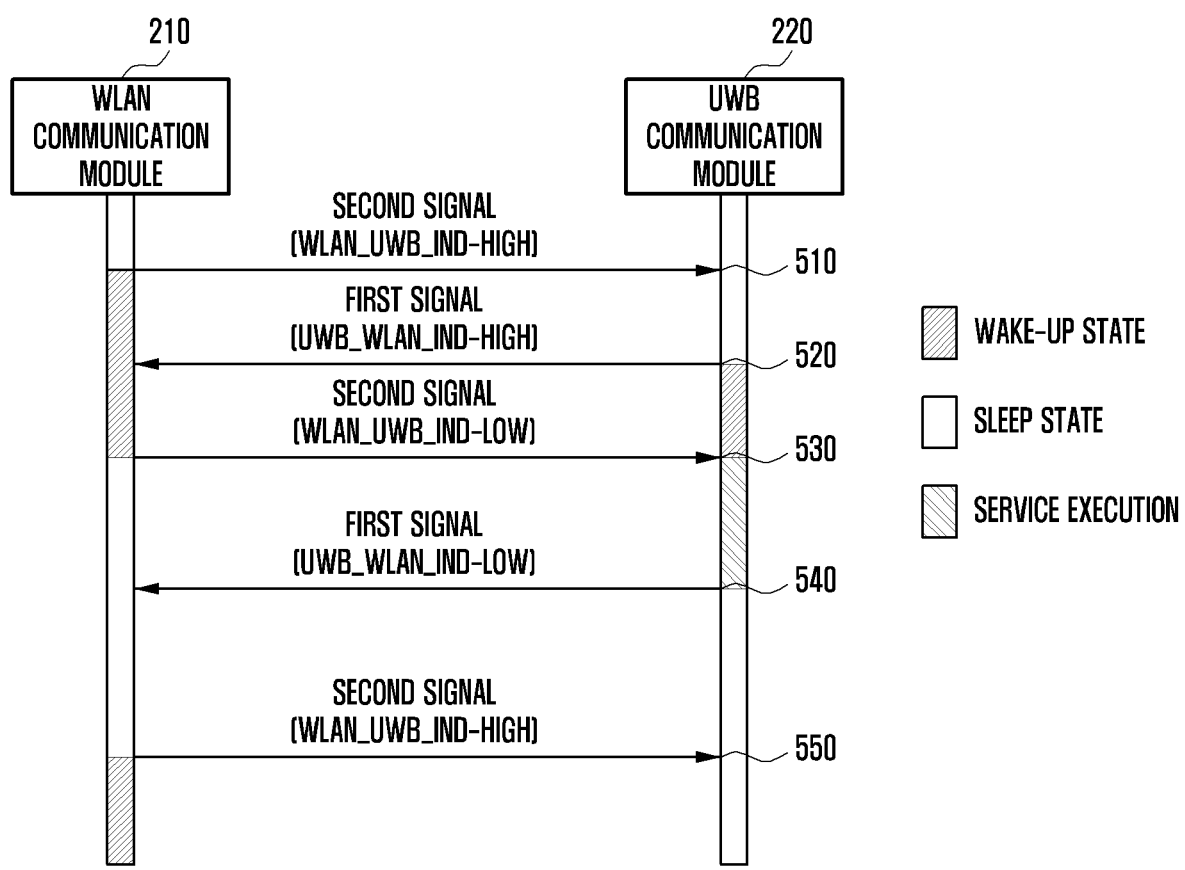
FIG. 5 is a sequence diagram illustrating signals exchanged between a UWB communication module and a WLAN communication module in a wake-up state according to an embodiment of the disclosure.

FIG. 5 is a sequence diagram illustrating signals exchanged between a UWB communication module and a WLAN communication module in a wake-up state according to an embodiment of the disclosure.

Referring to FIG. 5, both the WLAN communication module (e.g., WLAN communication module 210 in FIGS. 2A and 2B) and the UWB communication module (e.g., UWB communication module 220 in FIGS. 2A and 2B) may be in a wake-up state. The WLAN communication module 210 and the UWB communication module 220 may provide a service in the wake-up state. A service (e.g., UWB service or WLAN service) may be provided by using a specific frequency band (e.g., 6 GHz) or by using another frequency band.

In various embodiments of the disclosure, a WLAN service may be a game running with a connection to the WLAN. The user may be playing a game using the electronic device (e.g., electronic device 101 in FIG. 1). The WLAN communication module 210 may be in the wake-up state to support the game. The WLAN communication module 210 may support the game by using the specific frequency band.

Referring to FIG. 5, at operation 510, to use a specific frequency band, the WLAN communication module 210 may change the second signal (e.g., WLAN_UWB_IND) (e.g., signal strength) to "high" and transmit it to the UWB communication module 220. In an embodiment of the disclosure, to use the specific frequency band, the WLAN communication module 210 may transition from the sleep state to the wake-up state, and may change the second signal (e.g., WLAN_UWB_IND) (e.g., signal strength) to "high" and transmit it to the UWB communication module 220. In an embodiment of the disclosure, even when the WLAN communication module 210 is in the wake-up state, if the specific frequency band is not used, the second signal (e.g., signal strength) may be "low".

In various embodiments of the disclosure, the user may use a keyless car access service through the electronic device 101 while playing the game. The keyless car access service may be a UWB service. When the keyless car access service is executed, the UWB communication module 220 may transition to the wake-up state.

In various embodiments of the disclosure, at operation 520, to use the specific frequency band, the UWB communication module 220 in the wake-up state may change the first signal (e.g., UWB_WLAN_IND) (e.g., signal strength) to "high" and transmit it to the WLAN communication module 210. For example, for using the specific frequency band, the UWB communication module 220 may make a transition from the sleep state to the wake-up state so as to change the first signal (e.g., UWB_WLAN_IND) (e.g., signal strength) to "high" and transmit it to the WLAN communication module 210. The UWB communication module 220 may change the first signal (e.g., signal strength) to "high" and transmit it to the WLAN communication module 210 without determining the state or strength (e.g., "high") of the second signal. In various embodiments of the disclosure, for the use of the specific frequency band, the priority of the UWB communication module 220 may be higher than that of the WLAN communication module 210.

In various embodiments of the disclosure, the UWB communication module 220 may determine whether the second signal (e.g., signal strength) is "low", and may change the first signal (e.g., signal strength) to "high" and transmit it to the WLAN communication module 210. When the first signal (e.g., signal strength) is "high" for a preset time or longer, the UWB communication module 220 may notify the processor (e.g., processor 120 in FIG. 1) of an abnormality of the WLAN communication module 210. The UWB communication module 220 may determine the second signal (e.g., signal strength) when failing to provide a UWB service, and may, if the second signal is "high", notify the processor 120 that interference has occurred due to the WLAN communication module 210.

In various embodiments of the disclosure, when the first signal (e.g., signal strength) is changed to "high", the WLAN communication module 210 may end the use of the specific frequency band within a preset time. Upon detecting an interrupt caused by the first signal (e.g., signal strength) having been changed to "high", the WLAN communication module 210 may terminate the use of the specific frequency band within a preset time.

Referring to FIG. 5, at operation 530, the WLAN communication module 210 may terminate the use of the specific frequency band, and may change the second signal (e.g., signal strength) to "low" and transmit it to the UWB communication module 220. In an embodiment of the disclosure, when the WLAN communication module 210 and the UWB communication module 220 share the antenna (e.g., antenna 260 in FIG. 2B) as shown in FIG. 2B, the WLAN communication module 210 may control the antenna switch module (e.g., antenna switch module 250 in FIG. 2B) so that the UWB communication module 220 can use the antenna 260. For example, when receiving the first signal set to "high" or before changing the second signal (e.g., signal strength) to "low" and transmitting it to the UWB communication module 220 at operation 530, the WLAN communication module 210 may transmit a third signal (e.g., WLAN_ANT_SWITCH) to the antenna switch module 250 at operation 520. The third signal may be a signal for switching the antenna 260. For example, the WLAN communication module 210 may change the third signal (e.g., signal strength) to "high" and transmit it to the antenna switch module 250 so that the UWB communication module 220 may use the antenna 260.

In various embodiments of the disclosure, the UWB communication module 220 may execute a UWB service (e.g., keyless car access) by using the specific frequency band. When the execution of the UWB service is terminated or the use of the specific frequency band (e.g., 6 GHz) is terminated, at operation 540, the UWB communication module 220 may change the first signal (e.g., signal strength) to "low" and transmit it to the WLAN communication module 210. In an embodiment of the disclosure, when the WLAN communication module 210 and the UWB communication module 220 share the antenna (e.g., antenna 260 in FIG. 2B) as shown in FIG. 2B, the WLAN communication module 210 may control the antenna switch module (e.g., antenna switch module 250 in FIG. 2B). For example, when receiving the first signal set to "low" at operation 540, the WLAN communication module 210 may transmit a third signal to the antenna switch module 250. For example, the WLAN communication module 210 may change the third signal (e.g., signal strength) to "low" and transmit it to the antenna switch module 250 so that the antenna 260 can be used by the WLAN communication module 210.

Referring to FIG. 5, thereafter, to use the specific frequency band again, at operation 550, the WLAN communication module 210 may change the second signal (e.g., signal strength) to "high" and transmit it to the UWB communication module 220. The WLAN communication module 210 may support a game again by using the specific frequency band.

Figure 6:
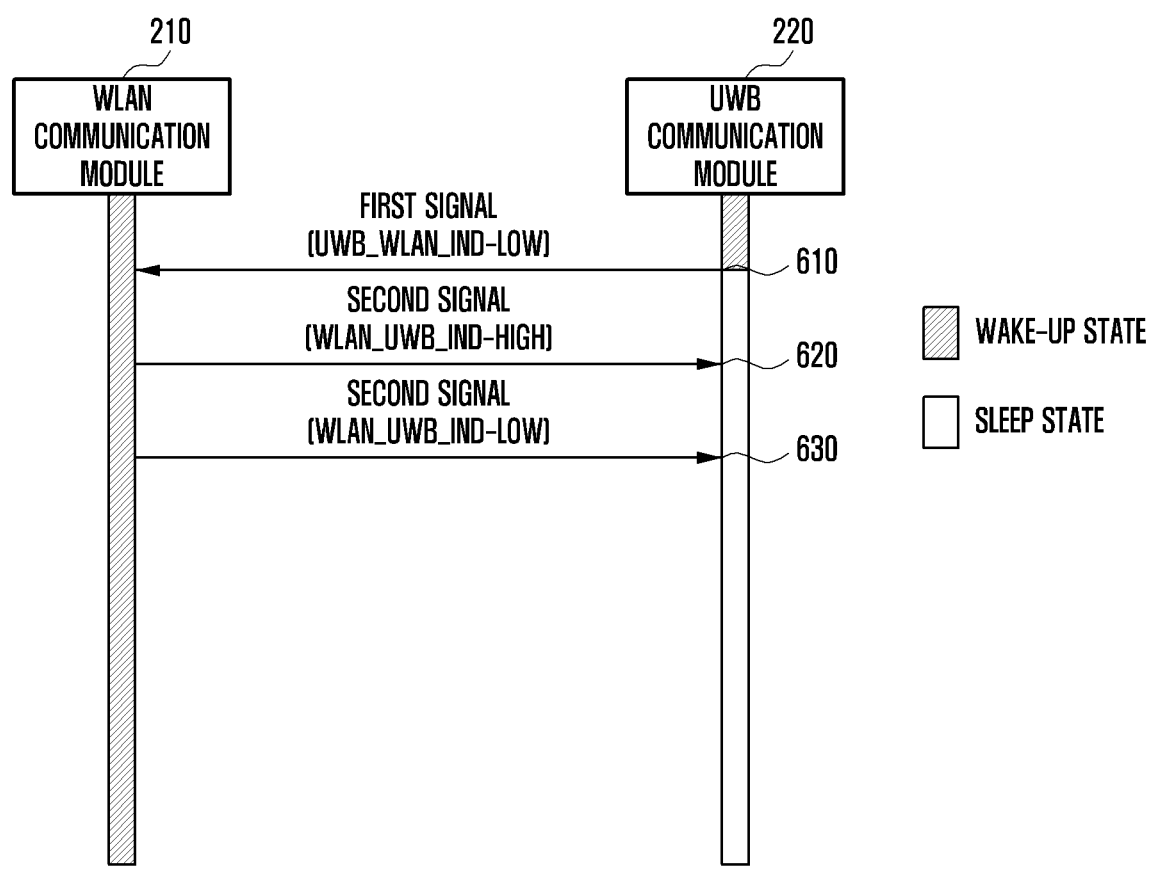
FIG. 6 is a sequence diagram illustrating signals exchanged between a WLAN communication module and a UWB communication module in a sleep state according to an embodiment of the disclosure.

FIG. 6 is a sequence diagram illustrating signals exchanged between a WLAN communication module and a UWB communication module in a sleep state according to an embodiment of the disclosure.

Referring to FIG. 6, the WLAN communication module (e.g., WLAN communication module 210 in FIGS. 2A and 2B) may be in the wake-up state. The WLAN communication module 210 in the wake-up state may execute a service by using a frequency band (e.g., 2.4 GHz or 5 GHz) other than a specific frequency band (e.g., 6 GHz).

In various embodiments of the disclosure, the UWB communication module (e.g., UWB communication module 220 in FIGS. 2A and 2B) may be in the wake-up state. In various embodiments of the disclosure, when transitioning to the sleep state, at operation 610, the UWB communication module 220 may change the first signal (e.g., UWB_WLAN_IND) (e.g., signal strength) to "low" and transmit it to the WLAN communication module 210.

In various embodiments of the disclosure, at operation 620, to use the specific frequency band, the WLAN communication module 210 may change the second signal (e.g., WLAN_UWB_IND) (e.g., signal strength) to "high" and transmit it to the UWB communication module 220.

In various embodiments of the disclosure, when the use of the specific frequency band is terminated, at operation 630, the WLAN communication module 210 may change the second signal (e.g., signal strength) to "low" and transmit it to the UWB communication module 220. The WLAN communication module 210 may be in the wake-up state. In an embodiment of the disclosure, when the WLAN communication module 210 and the UWB communication module 220 share the antenna (e.g., antenna 260 in FIG. 2B) as shown in FIG. 2B, the WLAN communication module 210 may control the antenna switch module (e.g., antenna switch module 250 in FIG. 2B) so that the UWB communication module 220 can use the antenna 260. For example, when receiving the first signal set to "high" or before changing the second signal (e.g., signal strength) to "low" and transmitting it to the UWB communication module 220 at operation 630, the WLAN communication module 210 may transmit a third signal (e.g., WLAN_ANT_SWITCH) to the antenna switch module 250 at operation 630. The third signal may be a signal for switching the antenna 260. For example, the WLAN communication module 210 may change the third signal (e.g., signal strength) to "high" and transmit it to the antenna switch module 250 so that the UWB communication module 220 may use the antenna 260.

Figure 7:
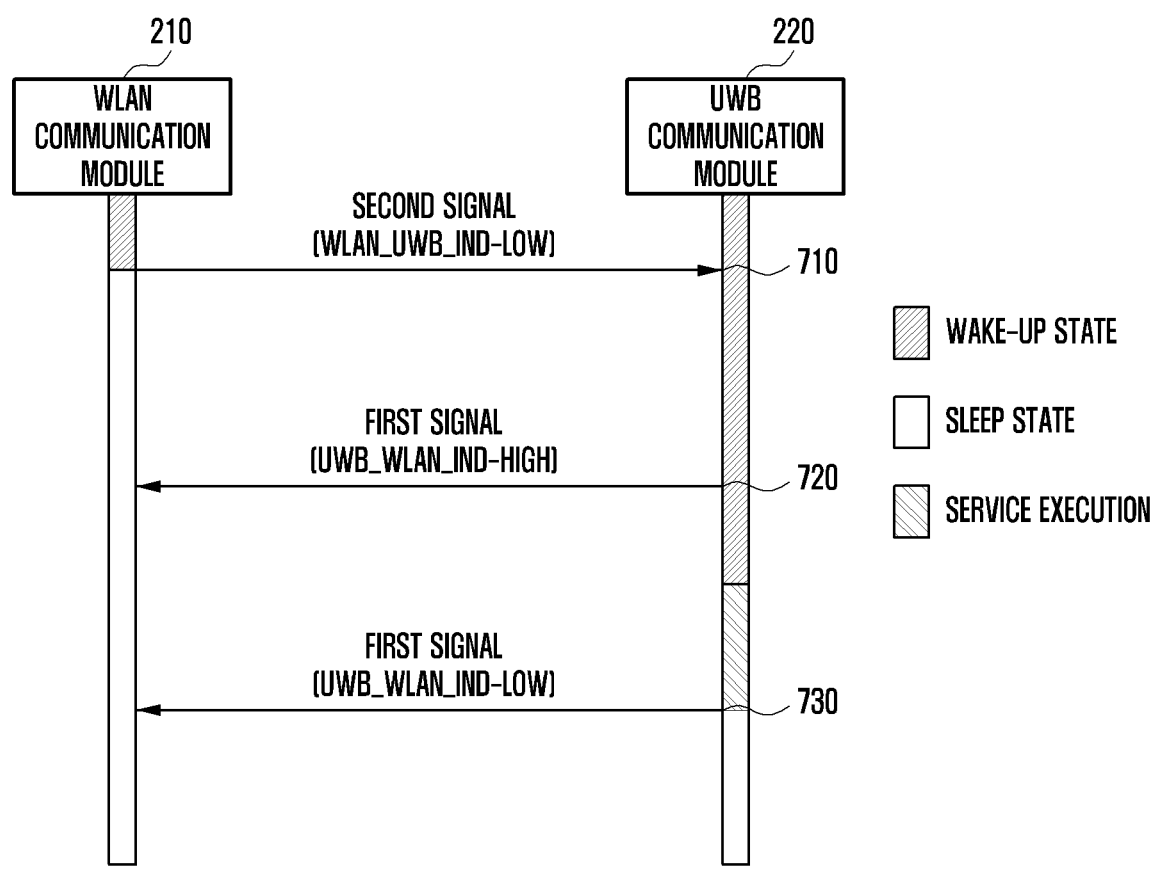
FIG. 7 is a sequence diagram illustrating signals exchanged between a UWB communication module and a WLAN communication module in a sleep state according to an embodiment of the disclosure.

FIG. 7 is a sequence diagram illustrating signals exchanged between a UWB communication module and a WLAN communication module in a sleep state according to an embodiment of the disclosure.

Referring to FIG. 7, the UWB communication module (e.g., UWB communication module 220 in FIGS. 2A and 2B) may be in the wake-up state. The UWB communication module 220 in the wake-up state may execute a service by using a frequency band other than a specific frequency band.

In various embodiments of the disclosure, the WLAN communication module (e.g., WLAN communication module 210 in FIGS. 2A and 2B) may be in the wake-up state. In various embodiments of the disclosure, at operation 710, when transitioning to the sleep state, the WLAN communication module 210 may change the second signal (e.g., WLAN_UWB_IND) (e.g., signal strength) to "low" and transmit it to the UWB communication module 220. For example, the WLAN communication module 210 may change the second signal (e.g., WLAN_UWB_IND) (e.g., signal strength) to "low" in the wake-up state, transmit it to the UWB communication module 220, and then make a transition to the sleep state. As another example, the WLAN communication module 210 may make a transition from the wake-up state to the sleep state, and then change the second signal (e.g., WLAN_UWB_IND) (e.g., signal strength) to "low" and transmit it to the UWB communication module 220.

In an embodiment of the disclosure, when the WLAN communication module 210 and the UWB communication module 220 share the antenna (e.g., antenna 260 in FIG. 2B) as shown in FIG. 2B, the WLAN communication module 210 may control the antenna switch module (e.g., antenna switch module 250 in FIG. 2B) so that the UWB communication module 220 can use the antenna 260. For example, when receiving the first signal set to "high" or before changing the second signal (e.g., signal strength) to "low" and transmitting it to the UWB communication module 220 at operation 710, the WLAN communication module 210 may transmit a third signal to the antenna switch module 250 at operation 710. For example, the WLAN communication module 210 may change the third signal (e.g., signal strength) to "high" and transmit it to the antenna switch module 250 so that the UWB communication module 220 can use the antenna 260.

Referring to FIG. 7, at operation 720, to use the specific frequency band, the UWB communication module 220 in the wake-up state may change the first signal (e.g., UWB_WLAN_IND) (e.g., signal strength) to "high" and transmit it to the WLAN communication module 210. The UWB communication module 220 may change the first signal (e.g., signal strength) to "high" and transmit it to the WLAN communication module 210 without determining the state (e.g., "low") of the second signal.

In various embodiments of the disclosure, the UWB communication module 220 may execute a service (e.g., keyless car access) by using the specific frequency band when a preset time elapses after transmitting the first signal. In various embodiments of the disclosure, the preset time is a duration in which UWB technology is utilized, and may vary depending on the UWB service. For example, the preset time may be 24 ms in the case of keyless car access, and the preset time may be 5 ms in the case of Find My X. As another example, the preset time may be up to 30 ms.

In various embodiments of the disclosure, the UWB communication module 220 may terminate execution of the service. When the execution of the service is terminated or the use of the specific frequency band is ended, at operation 730, the UWB communication module 220 may change the first signal (e.g., signal strength) to "low" and transmit it to the WLAN communication module 210. The UWB communication module 220 may make a transition to the sleep state when the execution of the service is terminated.

Figure 8:
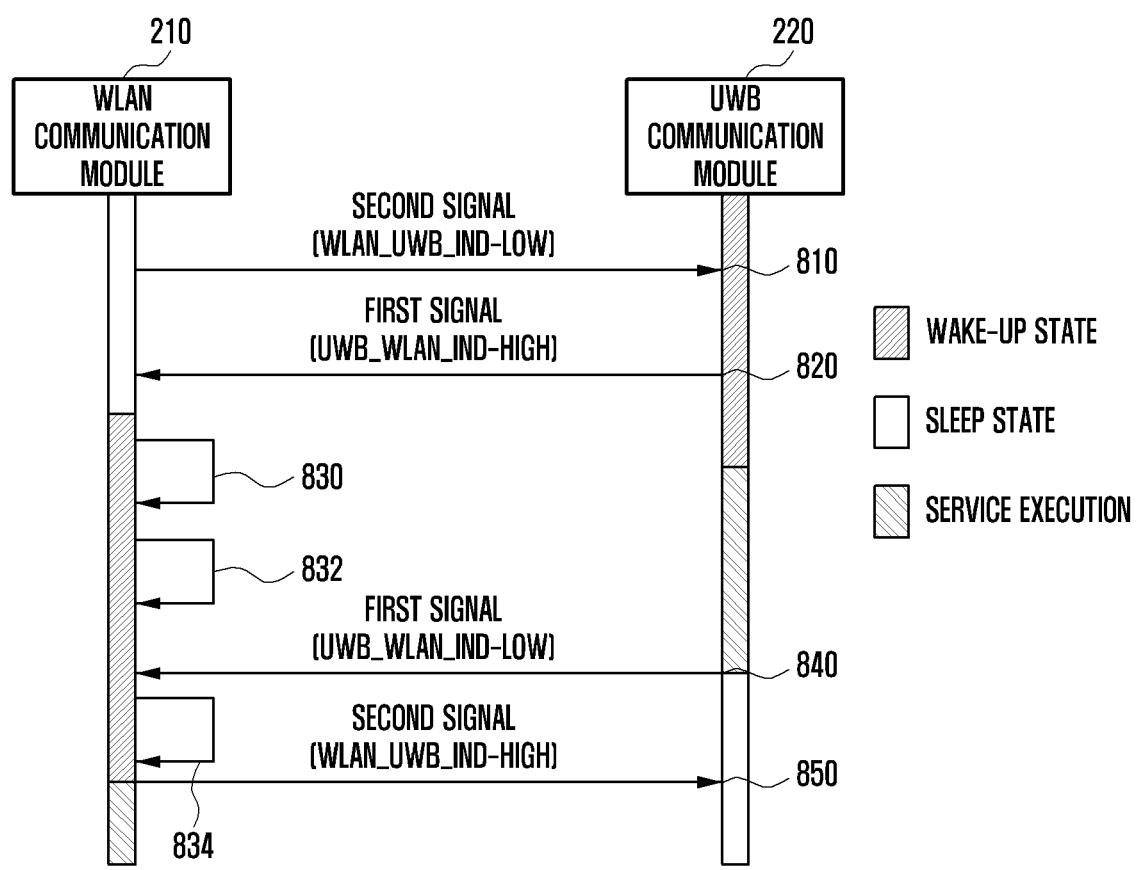
FIG. 8 is a sequence diagram illustrating signals exchanged when a WLAN communication module attempts to use a specific frequency band while a UWB communication module is using the specific frequency band according to an embodiment of the disclosure.

FIG. 8 is a sequence diagram illustrating signals exchanged when a WLAN communication module attempts to use a specific frequency band while a UWB communication module is using a specific frequency band according to an embodiment of the disclosure.

Referring to FIG. 8, the UWB communication module (e.g., UWB communication module 220 in FIGS. 2A and 2B) may be in the wake-up state.

In various embodiments of the disclosure, to notify the UWB communication module 220 that the specific frequency band is not being used, at operation 810, the WLAN communication module (e.g., WLAN communication module 210 in FIGS. 2A and 2B) may change the second signal (e.g., WLAN_UWB_IND) (e.g., signal strength) to "low" and transmit it to the UWB communication module 220.

Referring to FIG. 8, at operation 820, to use the specific frequency band, the UWB communication module 220 may change the first signal (e.g., UWB_WLAN_IND) (e.g., signal strength) to "high" and transmit it to the WLAN communication module 210. The UWB communication module 220 may change the first signal (e.g., signal strength) to "high" and transmit it to the WLAN communication module 210 without determining the state (e.g., "low") of the second signal. The UWB communication module 220 may execute a service by using the specific frequency band when a preset time elapses after transmitting the first signal.

In various embodiments of the disclosure, the WLAN communication module 210 may make a transition to the wake-up state and attempt to provide a service by using the specific frequency band. The WLAN communication module 210 may determine the state (e.g., "low" or "high") of the first signal before using the specific frequency band. In an embodiment of the disclosure, at operation 830, if the first signal (e.g., signal strength) is "high", the WLAN communication module 210 may wait without using the specific frequency band. After a certain period of time, the WLAN communication module 210 may determine the state (e.g., "low" or "high") of the first signal again. In an embodiment of the disclosure, at operation 832, if the first signal (e.g., signal strength) is "high", the WLAN communication module 210 may wait further without using the specific frequency band.

In various embodiments of the disclosure, when a maximum waiting time is configured, if the maximum waiting time elapses, the WLAN communication module 210 may transmit the second signal (e.g., signal strength) as in operation 850 without determining the first signal (e.g., signal strength).

Referring to FIG. 8, when the use of the specific frequency band is terminated, at operation 840, the UWB communication module 220 may change the first signal (e.g., signal strength) to "low" and transmit it to the WLAN communication module 210. For example, the UWB communication module 220 may change the first signal to "low" and transmit it to the WLAN communication module 210, and then make a transition to the sleep state.

Referring to FIG. 8, at operation 834, the WLAN communication module 210 may determine the state (e.g., "low" or "high") of the first signal again. If the first signal (e.g., signal strength) is "low", at operation 850, the WLAN communication module 210 may change the second signal (e.g., signal strength) to "high" and transmit it to the UWB communication module 220, and may execute a service by using the specific frequency band.

In various embodiments of the disclosure, the WLAN communication module 210 may determine the first signal (e.g., signal strength) only once at a specified time without repeatedly determining the first signal. For example, the WLAN communication module 210 may determine the state (e.g., "low" or "high") of the first signal at a time point designated based on information on the operation period and/or operation time of the UWB communication module 220.

Figure 9:
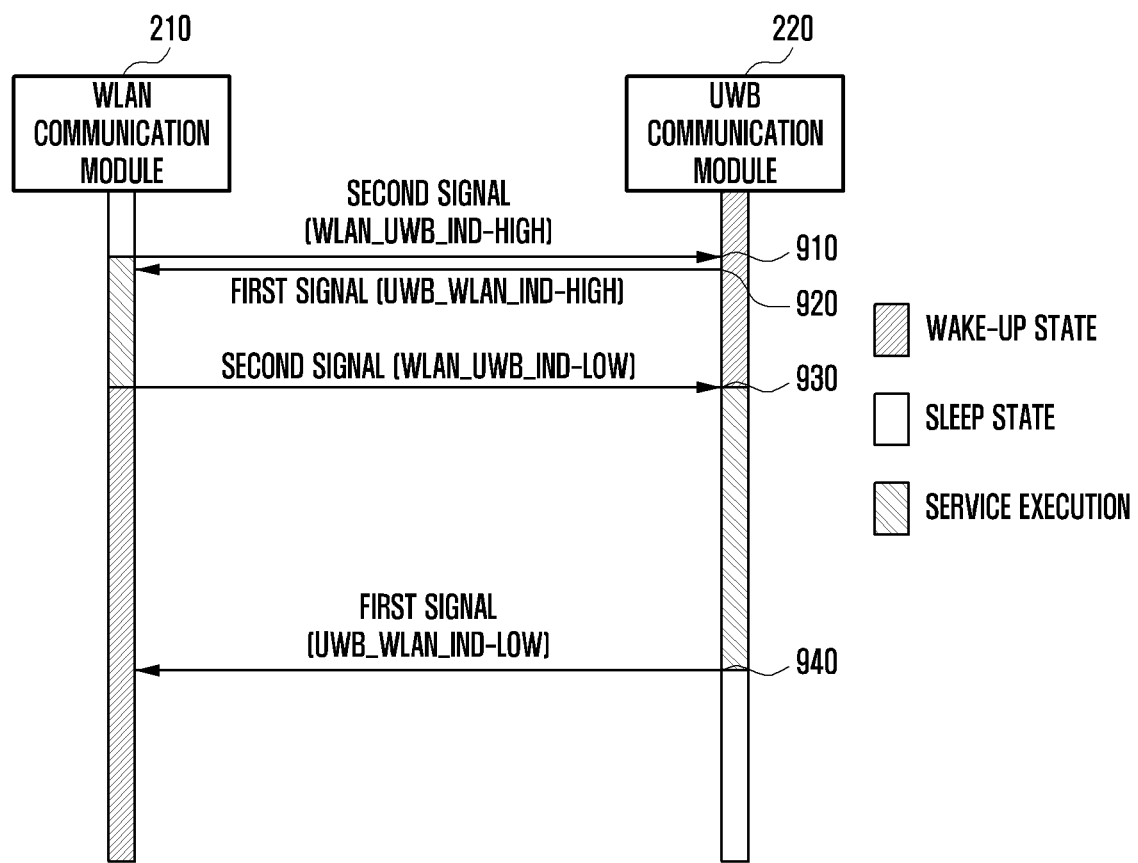
FIG. 9 is a sequence diagram illustrating signals exchanged when a WLAN communication module and a UWB communication module attempt to use a specific frequency band at a same time according to an embodiment of the disclosure.

FIG. 9 is a sequence diagram illustrating signals exchanged when a WLAN communication module and a UWB communication module attempt to use a specific frequency band at a same time according to an embodiment of the disclosure.

Referring to FIG. 9, the WLAN communication module (e.g., WLAN communication module 210 in FIGS. 2A and 2B) may be in the sleep state, and the UWB communication module (e.g., UWB communication module 220 in FIGS. 2A and 2B) may be in the wake-up state.

Referring to FIG. 9, at operation 910, to use the specific frequency band, the WLAN communication module 210 may change the second signal (e.g., WLAN_UWB_IND) (e.g., signal strength) to "high" and transmit it to the UWB communication module 220. In various embodiments of the disclosure, when the WLAN communication module 210 and the UWB communication module 220 share the antenna (e.g., antenna 260 in FIG. 2B), the antenna 260 may be connected to the WLAN communication module 210 as the UWB communication module 220 does not use the specific frequency band.

Referring to FIG. 9, at operation 920, to use the specific frequency band, the UWB communication module 220 may also change the first signal (e.g., UWB_WLAN_IND) (e.g., signal strength) to "high" and transmit it to the WLAN communication module 210. The UWB communication module 220 may change the first signal (e.g., signal strength) to "high" and transmit it to the WLAN communication module 210 without determining the state (e.g., "high") of the second signal. In various embodiments of the disclosure, for using the specific frequency band, the priority of the UWB communication module 220 may be higher than that of the WLAN communication module 210.

In various embodiments of the disclosure, although having transmitted the second signal (e.g., signal strength) set to "high" to the UWB communication module 220 to use the specific frequency band, as the first signal (e.g., signal strength) set to "high" is received, the WLAN communication module 210 may terminate the use of the specific frequency band within a preset time. In an embodiment of the disclosure, at operation 930, the WLAN communication module 210 may terminate the use of a specific frequency band and may change the second signal (e.g., signal strength) to "low" and transmit it to the UWB communication module 220. In an embodiment of the disclosure, although not shown, the WLAN communication module 210 may make a transition to the sleep state after changing the second signal (e.g., signal strength) to "low" and transmitting it to the UWB communication module 220.

In various embodiments of the disclosure, when the WLAN communication module 210 and the UWB communication module 220 share the antenna 260, the WLAN communication module 210 may transmit the third signal to the antenna switch module 250 to control the antenna 260. The WLAN communication module 210 may transmit the third signal (e.g., signal strength) set to "high" to connect the antenna 260 to the UWB communication module 220. The WLAN communication module 210 may determine the first signal (e.g., signal strength) and the second signal (e.g., signal strength) to determine the third signal (e.g., signal strength).

In various embodiments of the disclosure, the UWB communication module 220 may execute a service by using the specific frequency band. In an embodiment of the disclosure, when the execution of the service is ended or the use of the specific frequency band is terminated, at operation 940, the UWB communication module 220 may change the first signal (e.g., signal strength) to "low" and transmit it to the WLAN communication module 210. For example, the UWB communication module 220 may make a transition to the sleep state after changing the first signal (e.g., signal strength) to "low" and transmitting it to the WLAN communication module 210. As another example, the WLAN communication module 210 may execute a service by using the specific frequency band after receiving the first signal set to "low".

In various embodiments of the disclosure, when the WLAN communication module 210 and the UWB communication module 220 share the antenna 260, the WLAN communication module 210 may determine the first signal (e.g., signal strength) to transmit the third signal to the antenna switch module 250. To connect the antenna 260 to the WLAN communication module 210, the WLAN communication module 210 may change the third signal (e.g., signal strength) to "low" and transmit it to the antenna switch module 250. When the antenna 260 is not used by the UWB communication module 220, the WLAN communication module 210 may connect to the antenna 260 even if the WLAN communication module 210 does not use the antenna 260.

Figure 10:
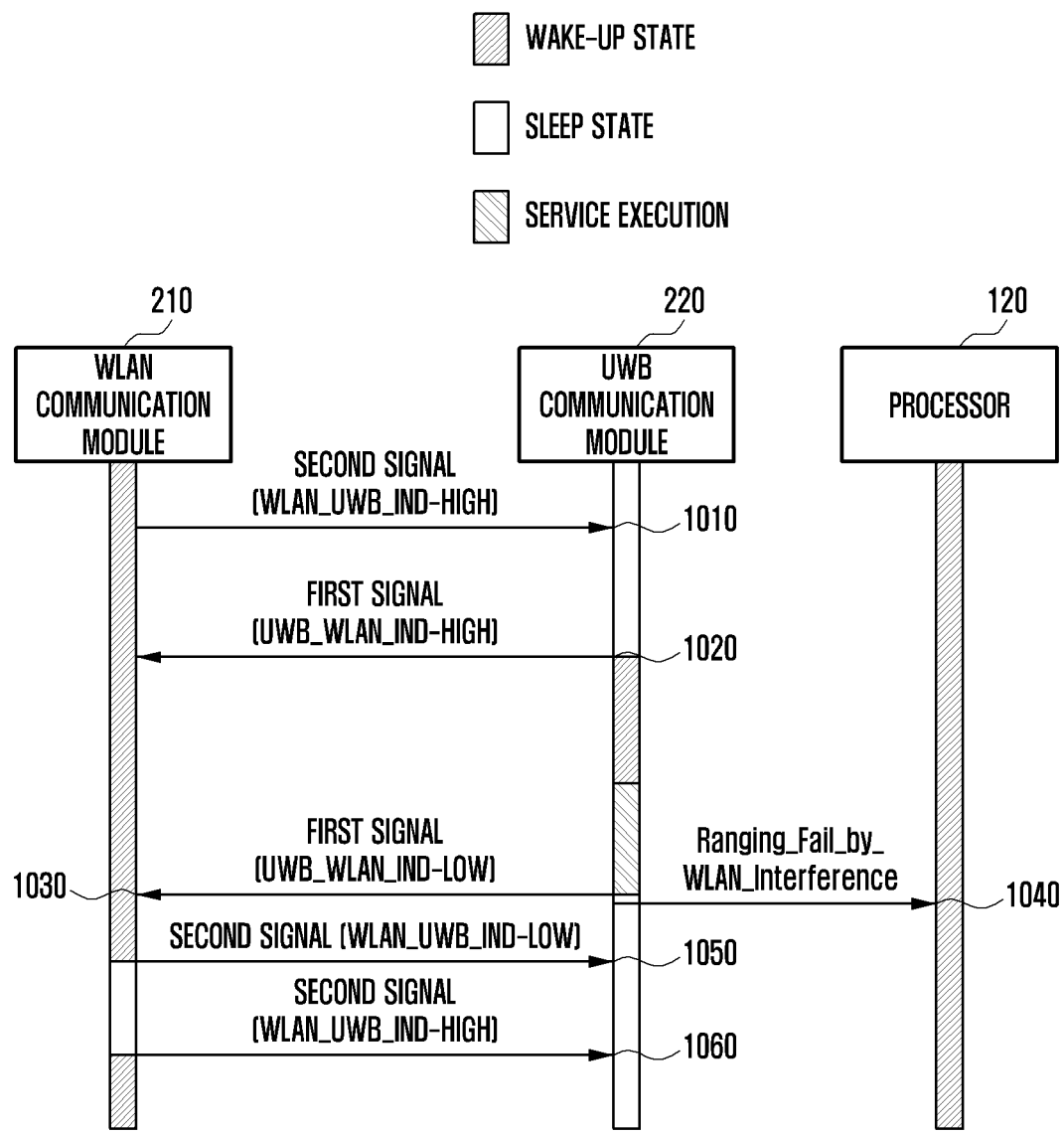
FIG. 10 is a sequence diagram illustrating signals exchanged between a WLAN communication module and a UWB communication module, where interference occurs due to simultaneous use of a specific frequency band according to an embodiment of the disclosure.

FIG. 10 is a sequence diagram illustrating signals exchanged between a WLAN communication module and a UWB communication module, where interference occurs due to simultaneous use of a specific frequency band according to an embodiment of the disclosure.

Referring to FIG. 10, the electronic device (e.g., electronic device 101 in FIG. 1) may include a WLAN communication module (e.g., WLAN communication module 210 in FIGS. 2A and 2B) and a UWB communication module (e.g., UWB communication module 220 in FIGS. 2A and 2B). The electronic device 101 may further include a processor (e.g., processor 120 in FIG. 1).

Referring to FIG. 10, at operation 1010, to use the specific frequency band, the WLAN communication module 210 in the wake-up state may change the second signal (e.g., WLAN_UWB_IND) (e.g., signal strength) to "high" and transmit it to the UWB communication module 220.

Referring to FIG. 10, at operation 1020, to use the specific frequency band, the UWB communication module 220 may change the first signal (e.g., UWB_WLAN_IND) (e.g., signal strength) to "high" and transmit it to the WLAN communication module 210. The UWB communication module 220 may change the first signal (e.g., signal strength) to "high" and transmit it to the WLAN communication module 210 without determining the state (e.g., "high") of the second signal. In various embodiments of the disclosure, for using the specific frequency band, the priority of the UWB communication module 220 may be higher than that of the WLAN communication module 210. However, in the case of a designated service (e.g., voice over Internet protocol (VoIP) service), the priority of the WLAN communication module 210 may be higher than that of the UWB communication module 220, so that the WLAN communication module 210 can continue to use the specific frequency band. For example, when executing a designated service (e.g., voice over Internet protocol (VoIP) service), the WLAN communication module 210 may ignore the first signal received from the UWB communication module 220.

In various embodiments of the disclosure, the UWB communication module 220 may execute a service by using the specific frequency band when a preset time elapses after changing the first signal (e.g., signal strength) to "high" and transmitting it. In an embodiment of the disclosure, at operation 1030, when the use of the specific frequency band is completed, the UWB communication module 220 may change the first signal (e.g., signal strength) to "low" and transmit it to the WLAN communication module 210.

In various embodiments of the disclosure, while the UWB communication module 220 is executing a service by using the specific frequency band, when the WLAN communication module 210 also executes a service by using the specific frequency band, interference may occur between signals of the specific frequency band. When interference occurs between signals of the specific frequency band, the service executed by the UWB communication module 220 may fail. For example, the UWB communication module 220 may fail to measure the distance to an external electronic device. In an embodiment of the disclosure, at operation 1040, the UWB communication module 220 may notify the processor 120 of a failure of the executing service. The processor 140 may display a notification message (e.g., UWB service failure) to the user.

In various embodiments of the disclosure, when the execution of the service by using the specific frequency band is ended, at operation 1050, the WLAN communication module 210 may change the second signal to "low" and transmit it to the UWB communication module 220.

In various embodiments of the disclosure, to use the specific frequency band again, at operation 1060, the WLAN communication module 210 may change the second signal to "high" and transmit it to the UWB communication module 220.

Figure 11:
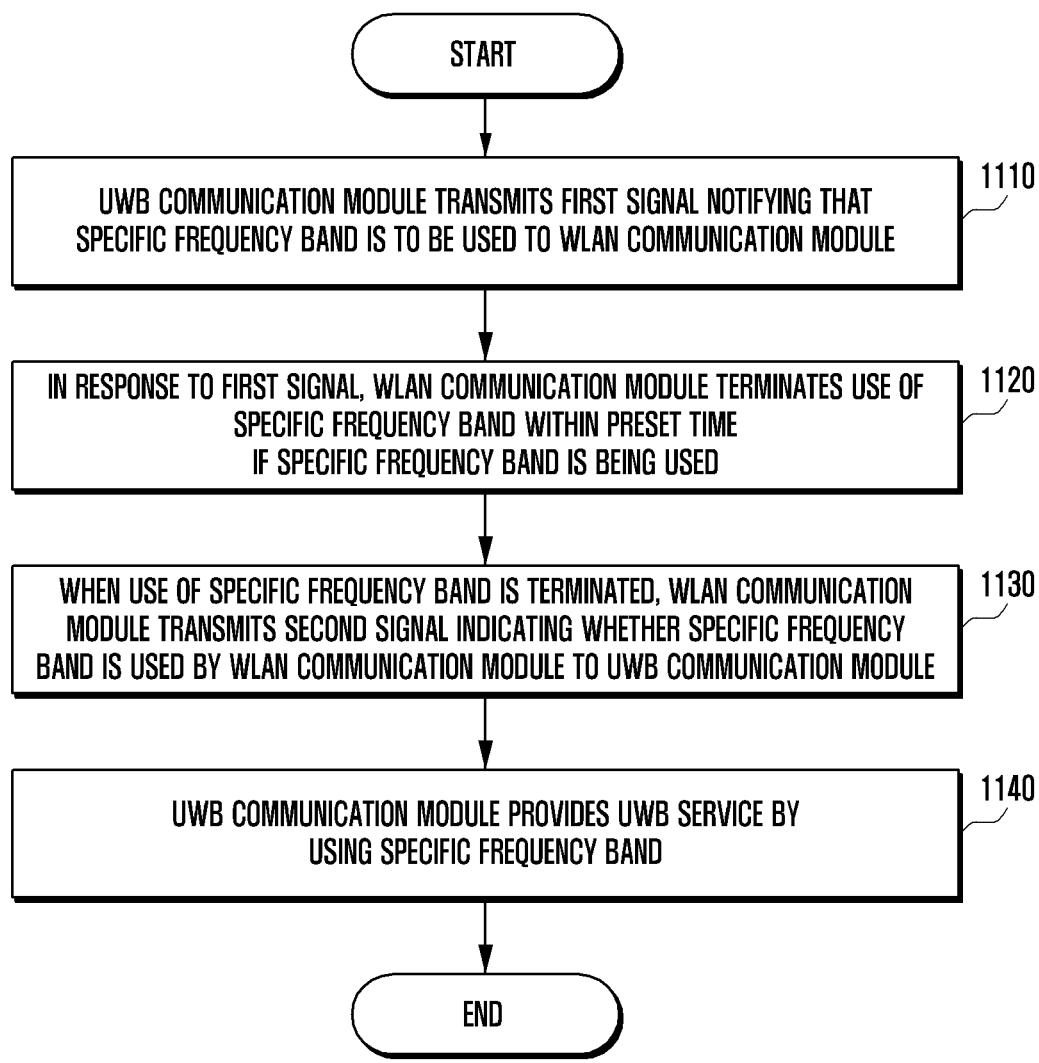
FIG. 11 is a flowchart depicting a method of an electronic device according to an embodiment of the disclosure.

FIG. 11 is a flowchart depicting a method of an electronic device according to an embodiment of the disclosure.

Referring to FIG. 11, the electronic device (e.g., electronic device 101 in FIG. 1) may include antennas (e.g., antennas 230 and 240 in FIG. 2A, or antenna 250 in FIG. 2B), a WLAN communication module (e.g., WLAN communication module 210 in FIGS. 2A and 2B), and a UWB communication module (e.g., UWB communication module 220 in FIGS. 2A and 2B). When the WLAN communication module 210 and the UWB communication module 220 share an antenna (e.g., in case of FIG. 2B), the electronic device may further include an antenna switch module (e.g., antenna switch module 250 in FIG. 2B).

At operation 1110, the UWB communication module 220 may transmit a first signal (e.g., UWB_WLAN_IND) notifying that a specific frequency band is to be used to the WLAN communication module 210. In various embodiments of the disclosure, when the first signal (e.g., signal strength) is changed (e.g., "high"→"low", or "low"→"high"), an interrupt may occur in the WLAN communication module 210.

At operation 1120, in response to the first signal, the WLAN communication module 210 may terminate the use of the specific frequency band within a preset time if the specific frequency band is being used. In various embodiments of the disclosure, when an interrupt occurs, the WLAN communication module 210 may determine the first signal and, if the specific frequency band is being used, terminate the use of the specific frequency band within a preset time.

At operation 1130, when the use of the specific frequency band is terminated, the WLAN communication module 210 may transmit the second signal (e.g., WLAN_UWB_IND) indicating whether the specific frequency band is used by the WLAN communication module 210 to the UWB communication module 220. In various embodiments of the disclosure, when the second signal (e.g., signal strength) is changed (e.g., "high"→"low", or "low"→"high"), an interrupt may occur in the UWB communication module 220. In various embodiments of the disclosure, when the WLAN communication module 210 and the UWB communication module 220 share the antenna, the WLAN communication module 210 may transmit the third signal (e.g., WLAN_ANT_SWITCH) for controlling the antenna switch module 250 to the antenna switch module 250. The WLAN communication module 210 may determine the state (e.g., "high" or "low") of the third signal based on the first signal and the second signal.

At operation 1140, the UWB communication module 220 may execute a UWB service by using the specific frequency band. In various embodiments of the disclosure, when an interrupt occurs, the UWB communication module 220 may determine the second signal and execute a UWB service by using the specific frequency band.

Figure 12:
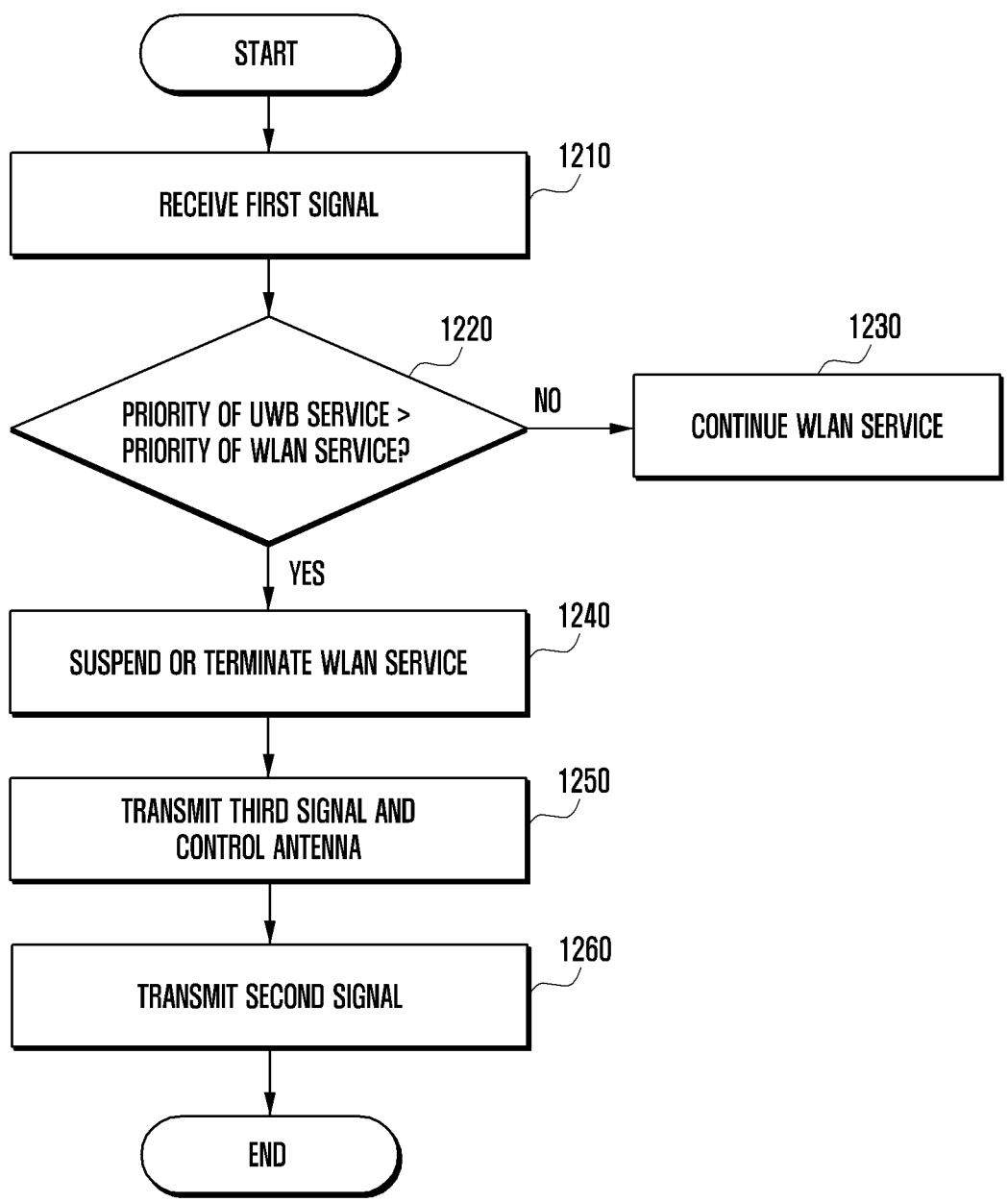
FIG. 12 is a flowchart of a method for a WLAN communication module to control an antenna shared with a UWB communication module according to an embodiment of the disclosure.

FIG. 12 is a flowchart of a method for a WLAN communication module to control an antenna shared with a UWB communication module according to an embodiment of the disclosure.

Referring to FIG. 12, the WLAN communication module (e.g., WLAN communication module 210 in FIGS. 2A and 2B) may share an antenna (e.g., antenna 260 in FIG. 2B) with the UWB communication module (e.g., UWB communication module 220 in FIGS. 2A and 2B). The antenna 260 may be an antenna for transmitting or receiving a signal of a specific frequency band (e.g., 6 GHz). To control the antenna 260, an antenna switch module (e.g., antenna switch module 250 in FIG. 2B) may be further included in the electronic device (e.g., electronic device 101 in FIG. 1). The antenna switch module 250 may connect the antenna 260 to the WLAN communication module 210 or to the UWB communication module 220.

In various embodiments of the disclosure, the WLAN communication module 210 may be a host and control the antenna switch module 250. The WLAN communication module 210 may connect the antenna 260 to the WLAN communication module 210 when the UWB communication module 220 does not use the specific frequency band.

In various embodiments of the disclosure, at operation 1210, the WLAN communication module 210 may receive a first signal (e.g., UWB_WLAN_IND) from the UWB communication module 220. The first signal may indicate whether the UWB communication module 220 uses the specific frequency band (e.g., 6 GHz).

Referring to FIG. 12, at operation 1220, the WLAN communication module 210 may determine whether the priority of the UWB service is higher than the priority of the WLAN service.

In various embodiments of the disclosure, if the priority of the UWB service is lower than that of the WLAN service, at operation 1230, the WLAN communication module 210 may continue to execute the WLAN service.

In various embodiments of the disclosure, if the priority of the UWB service is higher than that of the WLAN service, at operation 1240, the WLAN communication module 210 may suspend or terminate the execution of the WLAN service.

Referring to FIG. 12, at operation 1250, the WLAN communication module 210 may transmit a third signal (e.g., WLAN_ANT_SWITCH) to the antenna switch module 250 to connect the antenna 260 to the UWB communication module 220. In an embodiment of the disclosure, the third signal (e.g., signal strength) may be set to "high" to connect the antenna 260 to the UWB communication module 220.

Referring to FIG. 12, at operation 1260, the WLAN communication module 210 may transmit a second signal (e.g., WLAN_UWB_IND) to the UWB communication module 220. The second signal may be a signal indicating whether the WLAN communication module 210 uses the specific frequency band. The WLAN communication module 210 may utilize the second signal to indicate that the WLAN communication module 210 does not use the specific frequency band.

According to various embodiments of the disclosure, the electronic device 101 may include an antenna 230, 240 or 260 to transmit or receive a signal of a specific frequency band; a WLAN communication module 210; and a UWB communication module 220, wherein the UWB communication module 220 may be configured to transmit a first signal notifying that the specific frequency band is to be used to the WLAN communication module 210; and use the specific frequency band, wherein the WLAN communication module 210 may be configured to terminate, if the specific frequency band is being used, the use of the specific frequency band within a preset time in response to reception of the first signal; and transmit, when the use of the specific frequency band is terminated, a second signal indicating whether the specific frequency band is used by the WLAN communication module 210 to the UWB communication module 220.

In the electronic device 101 according to various embodiments of the disclosure, the specific frequency band may be available to the UWB communication module 220 and the WLAN communication module 210, and may be a frequency band in which interference can be caused by the UWB communication module 220 and the WLAN communication module 210.

In the electronic device 101 according to various embodiments of the disclosure, the UWB communication module 220 may be configured to determine the received second signal; and use the specific frequency band in case of determining that the use of the specific frequency band by the WLAN communication module 210 is terminated based on the determined second signal.

In the electronic device 101 according to various embodiments of the disclosure, the UWB communication module 220 may be configured to change the first signal when the use of the specific frequency band is completed.

In the electronic device 101 according to various embodiments of the disclosure, the WLAN communication module 210 may be configured to determine the changed first signal to use the specific frequency band.

According to various embodiments of the disclosure, the electronic device 101 may further include a processor 120, and wherein the UWB communication module 220 may be configured to determine whether interference has occurred between signals of the specific frequency band, and transmit the result of determining whether interference has occurred between signals of the specific frequency band to the processor.

In the electronic device 101 according to various embodiments of the disclosure, the WLAN communication module 210 may be configured to determine the first signal and determine whether to use a signal of the specific frequency band based on the determined first signal.

In the electronic device 101 according to various embodiments of the disclosure, the antenna may include a plurality of antennas 230 and 240, and the UWB communication module 220 and the WLAN communication module 210 may transmit or receive signals of the specific frequency band by using different antennas.

According to various embodiments of the disclosure, the electronic device 101 may further include an antenna switch module 250 to connect the antenna to the WLAN communication module 210 or the UWB communication module 220.

In the electronic device 101 according to various embodiments of the disclosure, the WLAN communication module 210 may be configured to transmit a third signal for antenna switching to the antenna switch module 250.

In the electronic device 101 according to various embodiments of the disclosure, the third signal may be determined based on the first signal and the second signal.

According to various embodiments of the disclosure, a method for operating an electronic device may include transmitting, by a UWB communication module 220, a first signal notifying that a specific frequency band is to be used to a WLAN module 210 (1110); terminating, in case that the specific frequency band is being used, by the WLAN communication module 210, a use of the specific frequency band within a preset time in response to reception of the first signal (1120); transmitting, when the use of the specific frequency band is terminated, by the WLAN communication module 210, a second signal indicating whether the specific frequency band is used by the WLAN communication module 210 to the UWB communication module 220 (1130); and using, by the UWB communication module 220, the specific frequency band (1140).

In the method for operating the electronic device according to various embodiments of the disclosure, using, by the UWB communication module 220, the specific frequency band may include determining, by the UWB communication module 220, the received second signal; and using, by the UWB communication module 220, the specific frequency band in case of determining that the use of the specific frequency band by the WLAN communication module 210 is terminated based on the determined second signal.

According to various embodiments of the disclosure, the method for operating the electronic device may further include changing, by the UWB communication module 220, the first signal when the use of the specific frequency band is completed.

According to various embodiments of the disclosure, the method for operating the electronic device may further include determining, by the WLAN communication module 210, the changed first signal and using the specific frequency band.

According to various embodiments of the disclosure, the method for operating the electronic device may further include determining, by the UWB communication module 220, whether interference has occurred between signals of the specific frequency band; and transmitting, by the UWB communication module 220, the result of determining whether interference has occurred between signals of the specific frequency band to a processor.

According to various embodiments of the disclosure, the method for operating the electronic device may further include determining, by the WLAN communication module 210, the first signal and determining whether to use a signal of the specific frequency band based on the determined first signal.

In the method for operating the electronic device according to various embodiments of the disclosure, the WLAN communication module 210 and the UWB communication module 220 may be configured to transmit or receive signals of the specific frequency band by using different antennas.

In the method for operating the electronic device according to various embodiments of the disclosure, the WLAN communication module 210 and the UWB communication module 220 may be configured to share an antenna 260 to transmit or receive a signal of the specific frequency band.

According to various embodiments of the disclosure, the method for operating the electronic device may further include transmitting, by the WLAN communication module 210, a third signal for switching the antenna 260 to an antenna switch module 250.

In addition, it is possible to provide various other embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an antenna to transmit or receive a signal of a specific frequency band;
a wireless local area network (WLAN) communication circuit; and
an ultra-wide band (UWB) communication circuit, wherein the UWB communication circuit is configured to:
transmit a first signal to the WLAN communication circuit notifying that the UWB communication circuit transmit or receive data via the specific frequency band, and
transmit or receive data via the specific frequency band, wherein the WLAN communication circuit is configured to:
terminate transmitting or receiving data via the specific frequency band within a preset time in response to reception of the first signal, and
transmit, when the transmitting or receiving data via the specific frequency band is terminated, a second signal to the UWB communication circuit, the second signal indicating that the WLAN communication circuit terminates the transmitting or receiving data via the specific frequency band.

2. The electronic device of claim 1, wherein the specific frequency band is available to the UWB communication circuit and the WLAN communication circuit, and is a frequency band where it is possible for the UWB communication circuit and the WLAN communication circuit to cause interference.

3. The electronic device of claim 1, wherein the UWB communication circuit is further configured to:
determine the second signal; and
transmit or receive the specific frequency band in case of determining that the transmitting or receiving of the specific frequency band by the WLAN communication circuit is terminated based on the determined second signal.

4. The electronic device of claim 1, wherein the UWB communication circuit is further configured to change the first signal when the transmitting or receiving of the specific frequency band is ended.

5. The electronic device of claim 4, wherein the WLAN communication circuit is further configured to determine the changed first signal to use the specific frequency band.

6. The electronic device of claim 1, further comprising a processor, and wherein the UWB communication circuit is further configured to:
determine whether interference has occurred between signals of the specific frequency band, and
transmit a result of determining whether interference has occurred between signals of the specific frequency band to the processor.

7. The electronic device of claim 1, wherein the WLAN communication circuit is further configured to determine the first signal and determine whether to transmit or receive a signal of the specific frequency band based on the determined first signal.

8. The electronic device of claim 1,
wherein the antenna includes a plurality of antennas, and
wherein the UWB communication circuit and the WLAN communication circuit are further configured to transmit or receive signals of the specific frequency band by using different antennas.

9. The electronic device of claim 1, further comprising an antenna switch circuit to connect the antenna to the WLAN communication circuit or the UWB communication circuit.

10. The electronic device of claim 9, wherein the WLAN communication circuit is further configured to transmit a third signal for switching the antenna to the antenna switch circuit.

11. The electronic device of claim 10, wherein the third signal is determined based on the first signal and the second signal.

12. A method for operating an electronic device, the method comprising:
transmitting, by an ultra-wide band (UWB) communication circuit, a first signal to a WLAN communication circuit notifying that the UWB communication circuit transmit or receive data via a specific frequency band;
transmitting or receiving, by the ultra-wide band (UWB) communication circuit, data via the specific frequency band,
terminating, by the WLAN communication circuit, transmitting or receiving data via the specific frequency band within a preset time in response to reception of the first signal; and
transmitting, by the WLAN communication circuit, when the transmitting or receiving data via the specific frequency band is terminated, a second signal to the UWB communication circuit, the second signal indicating that the WLAN communication circuit terminates the transmitting or receiving data via the specific frequency band.

13. The method of claim 12, wherein using, by the UWB communication circuit, the specific frequency band comprises:
determining, by the UWB communication circuit, the second signal; and
transmitting or receiving, by the UWB communication circuit, the specific frequency band in case of determining that the transmitting or receiving of the specific frequency band by the WLAN communication circuit is terminated based on the determined second signal.

14. The method of claim 12, further comprising changing, by the UWB communication circuit, the first signal when the transmitting or receiving of the specific frequency band is ended.

15. The method of claim 14, further comprising determining, by the WLAN communication circuit, the changed first signal and transmitting or receiving the specific frequency band.

16. The method of claim 12, further comprising:
determining, by the UWB communication circuit, whether interference has occurred between signals of the specific frequency band; and
transmitting, by the UWB communication circuit, a result of determining whether interference has occurred between signals of the specific frequency band to a processor.

17. The method of claim 12, further comprising determining, by the WLAN communication circuit, the first signal and determining whether to transmit or receive a signal of the specific frequency band based on the determined first signal.

18. The method of claim 12, wherein the WLAN communication circuit and the UWB communication circuit are configured to transmit or receive signals of the specific frequency band by using different antennas.

19. The method of claim 12, wherein the WLAN communication circuit and the UWB communication circuit are configured to transmit or receive a signal of the specific frequency band by using a shared antenna.

20. The method of claim 19, further comprising transmitting, by the WLAN communication circuit, a third signal for switching the antenna to an antenna switch circuit.

\* \* \* \* \*